United States Patent
Harrington et al.

(10) Patent No.: US 9,725,907 B2
(45) Date of Patent: Aug. 8, 2017

(54) FIRE RETARDANT ROOFING SYSTEM, SHINGLE AND LAYER

(71) Applicant: Owens Corning Intellectual Capital, LLC, Toledo, OH (US)

(72) Inventors: Edward Richard Harrington, Toledo, OH (US); Jonathan M. Verhoff, Reynoldsburg, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/209,510

(22) Filed: Mar. 13, 2014

(65) Prior Publication Data

US 2014/0272244 A1 Sep. 18, 2014

Related U.S. Application Data

(60) Provisional application No. 61/789,739, filed on Mar. 15, 2013.

(51) Int. Cl.
| | |
|---|---|
| *E04D 1/28* | (2006.01) |
| *E04D 1/26* | (2006.01) |
| *E04D 1/00* | (2006.01) |
| *B32B 37/24* | (2006.01) |
| *B32B 38/00* | (2006.01) |

(52) U.S. Cl.
CPC .............. *E04D 1/28* (2013.01); *E04D 1/26* (2013.01); *B32B 37/24* (2013.01); *B32B 38/0004* (2013.01); *B32B 2037/243* (2013.01); *B32B 2307/3065* (2013.01); *B32B 2395/00* (2013.01); *B32B 2419/06* (2013.01); *E04D 2001/005* (2013.01); *Y10T 428/19* (2015.01); *Y10T 428/24372* (2015.01)

(58) Field of Classification Search
CPC .................... Y10T 428/243; Y10T 428/19
USPC .................................... 428/141–150
See application file for complete search history.

(56) References Cited

U.S. PATENT DOCUMENTS

| | | |
|---|---|---|
| 3,180,783 A | 4/1965 | Walker et al. |
| 3,365,322 A | 1/1968 | Hinds |
| 4,218,502 A | 8/1980 | Graham et al. |
| 4,234,639 A | 11/1980 | Graham |
| 4,372,997 A | 2/1983 | Fritze et al. |
| 4,521,333 A | 6/1985 | Graham et al. |

(Continued)

FOREIGN PATENT DOCUMENTS

| | | |
|---|---|---|
| EP | 135261 | 3/1985 |
| EP | 301176 | 2/1994 |
| EP | 2532515 | 12/2012 |

OTHER PUBLICATIONS

Author Unknown, May 16, 2014, Grafguard Flame Retardant Additive Technical Data Sheet 226, Graftech International.*

(Continued)

*Primary Examiner* — Nathan Van Sell
(74) *Attorney, Agent, or Firm* — Calfee, Halter & Griswold LLP

(57) ABSTRACT

Roofing shingle layers, roofing shingles, and roofing systems having fire retardant properties are provided. In certain exemplary embodiments, the roofing shingle layers, roofing shingles, or roofing systems include an expandable fire retardant material. The expandable fire retardant material may comprise expandable graphite, ammonium polyphosphate, or a combination thereof.

8 Claims, 19 Drawing Sheets

(56) References Cited

U.S. PATENT DOCUMENTS

| | | | |
|---|---|---|---|
| 5,258,216 A * | 11/1993 | von Bonin et al. | 428/102 |
| 5,326,797 A | 7/1994 | Zimmerman et al. | |
| 5,615,523 A | 4/1997 | Wells et al. | |
| 5,657,603 A | 8/1997 | Goodhart et al. | |
| 5,840,413 A | 11/1998 | Kajander | |
| 5,965,257 A | 10/1999 | Ahluwalia | |
| 6,194,519 B1 | 2/2001 | Blalock et al. | |
| 6,235,347 B1 | 5/2001 | Arshinova et al. | |
| 6,352,786 B2 | 3/2002 | Arshinova et al. | |
| 6,436,510 B1 | 8/2002 | Heidel et al. | |
| 6,610,147 B2 | 8/2003 | Aschenbeck | |
| 6,635,140 B2 | 10/2003 | Phillips et al. | |
| 6,990,779 B2 | 1/2006 | Kiik et al. | |
| 7,272,915 B2 | 9/2007 | Peng | |
| 7,805,909 B2 | 10/2010 | Teng et al. | |
| 7,857,904 B2 | 12/2010 | Trumbore et al. | |
| 8,240,102 B2 | 8/2012 | Belt et al. | |
| 2003/0040241 A1 | 2/2003 | Kiik et al. | |
| 2006/0240224 A1 * | 10/2006 | Khan et al. | 428/143 |
| 2007/0166454 A1 * | 7/2007 | Gupta | 427/202 |
| 2008/0086970 A1 | 4/2008 | Teng et al. | |
| 2008/0102243 A1 * | 5/2008 | Gupta | 428/41.8 |
| 2008/0188590 A1 * | 8/2008 | Gupta | 523/179 |
| 2009/0104425 A1 | 4/2009 | Nandi et al. | |
| 2009/0229210 A1 | 9/2009 | Binkley et al. | |
| 2010/0037548 A1 | 2/2010 | Kalkanoglu et al. | |
| 2010/0167013 A1 * | 7/2010 | Cruz et al. | 428/147 |
| 2011/0011021 A1 * | 1/2011 | LaVietes et al. | 52/408 |
| 2011/0118371 A1 * | 5/2011 | Staal et al. | 521/139 |
| 2011/0232220 A1 * | 9/2011 | Belt et al. | 52/521 |
| 2012/0180948 A1 | 7/2012 | Aschenbeck | |
| 2012/0183684 A1 | 7/2012 | Aschenbeck | |
| 2012/0183685 A1 | 7/2012 | Aschenbeck | |
| 2013/0025225 A1 | 1/2013 | Vermilion et al. | |
| 2014/0130435 A1 | 5/2014 | Paradis et al. | |

OTHER PUBLICATIONS

Grober, Morris Harold, (1936), "Roofing granules", Bachelors Theses, Paper 59.*
Office action from U.S. Appl. No. 14/585,739 dated Feb. 6, 2015.
Office action from U.S. Appl. No. 14/585,739 dated May 13, 2015.
Office action from U.S. Appl. No. 14/978,105 dated Jan. 21, 2016.

* cited by examiner

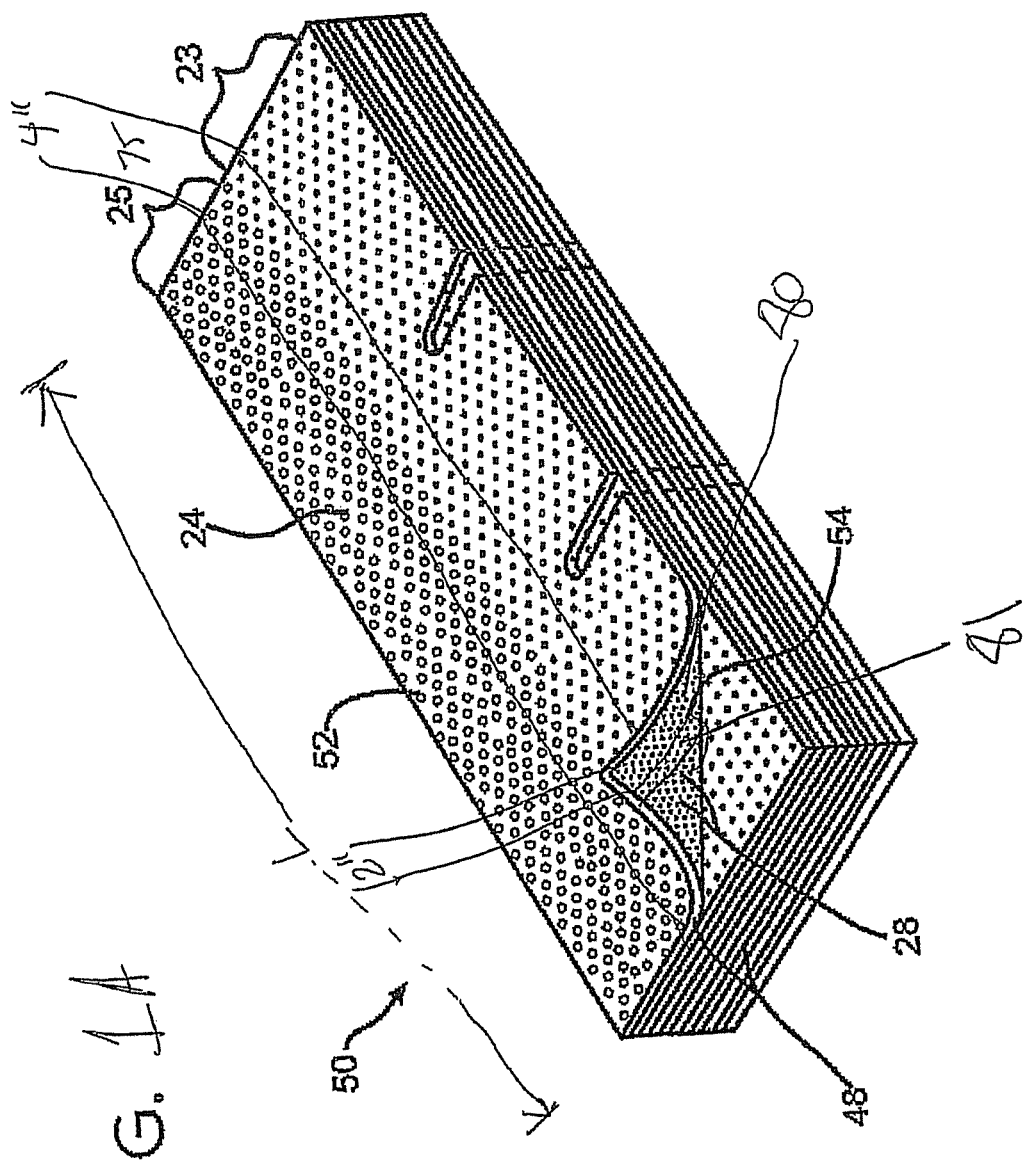

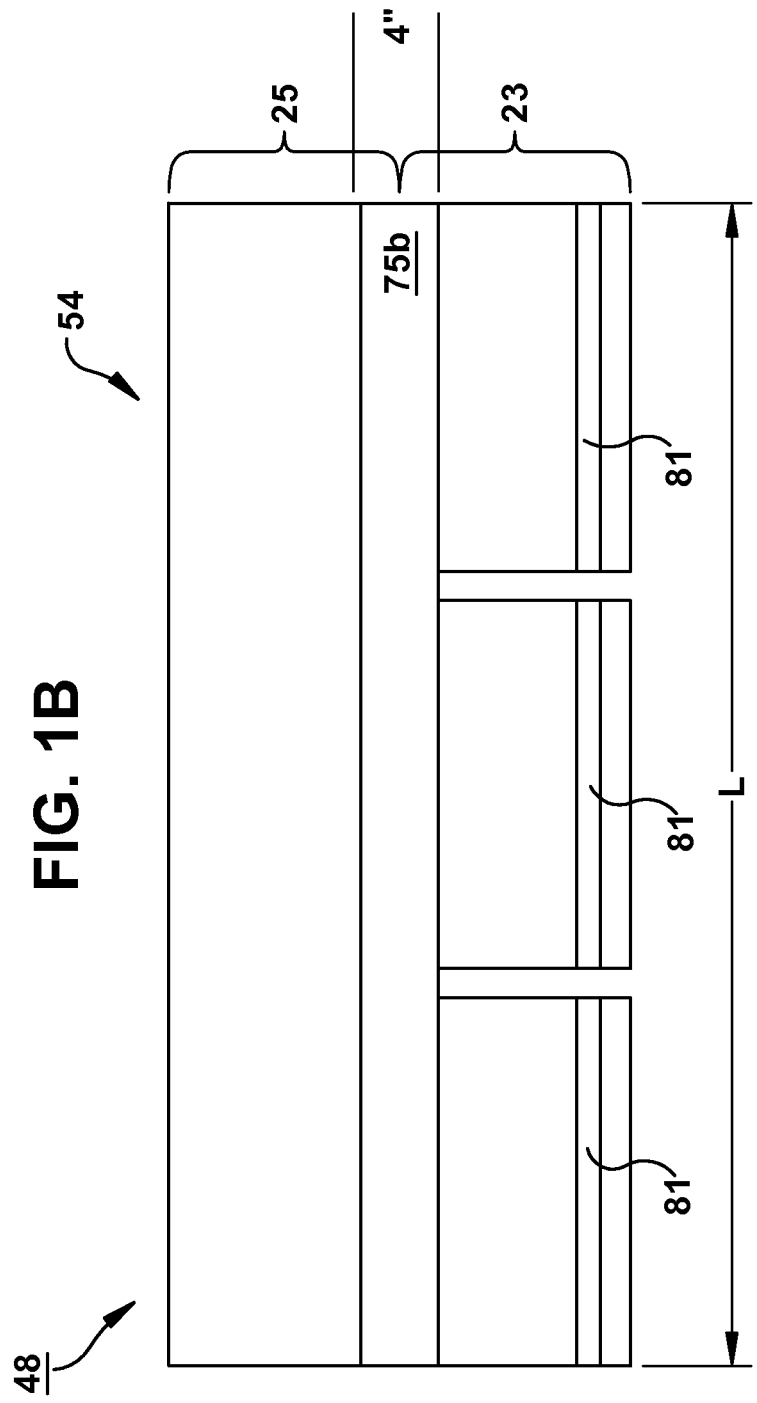

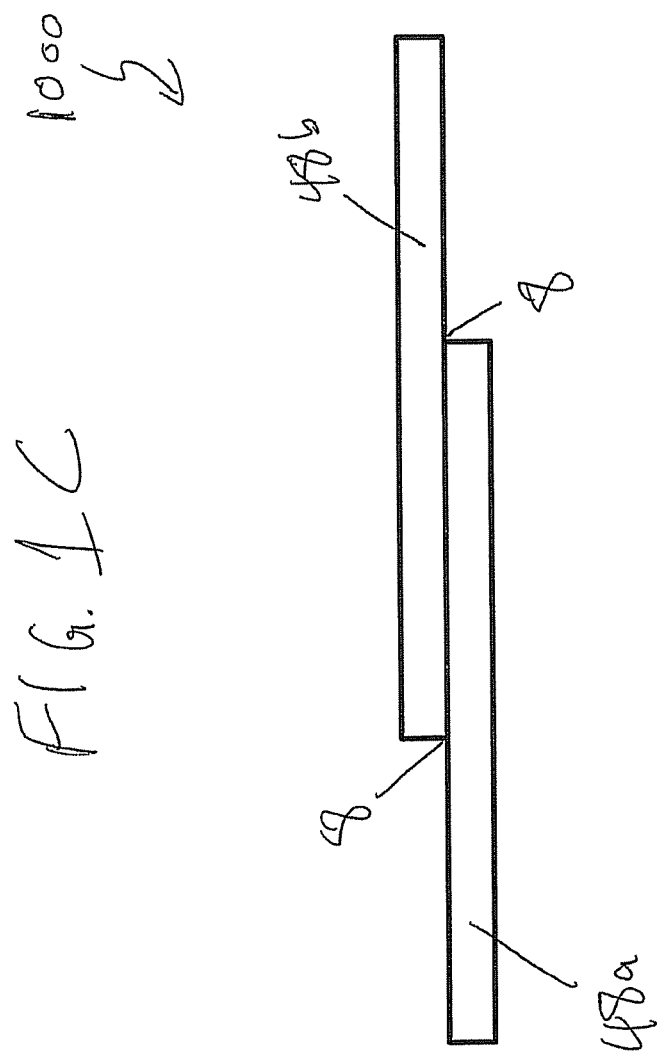

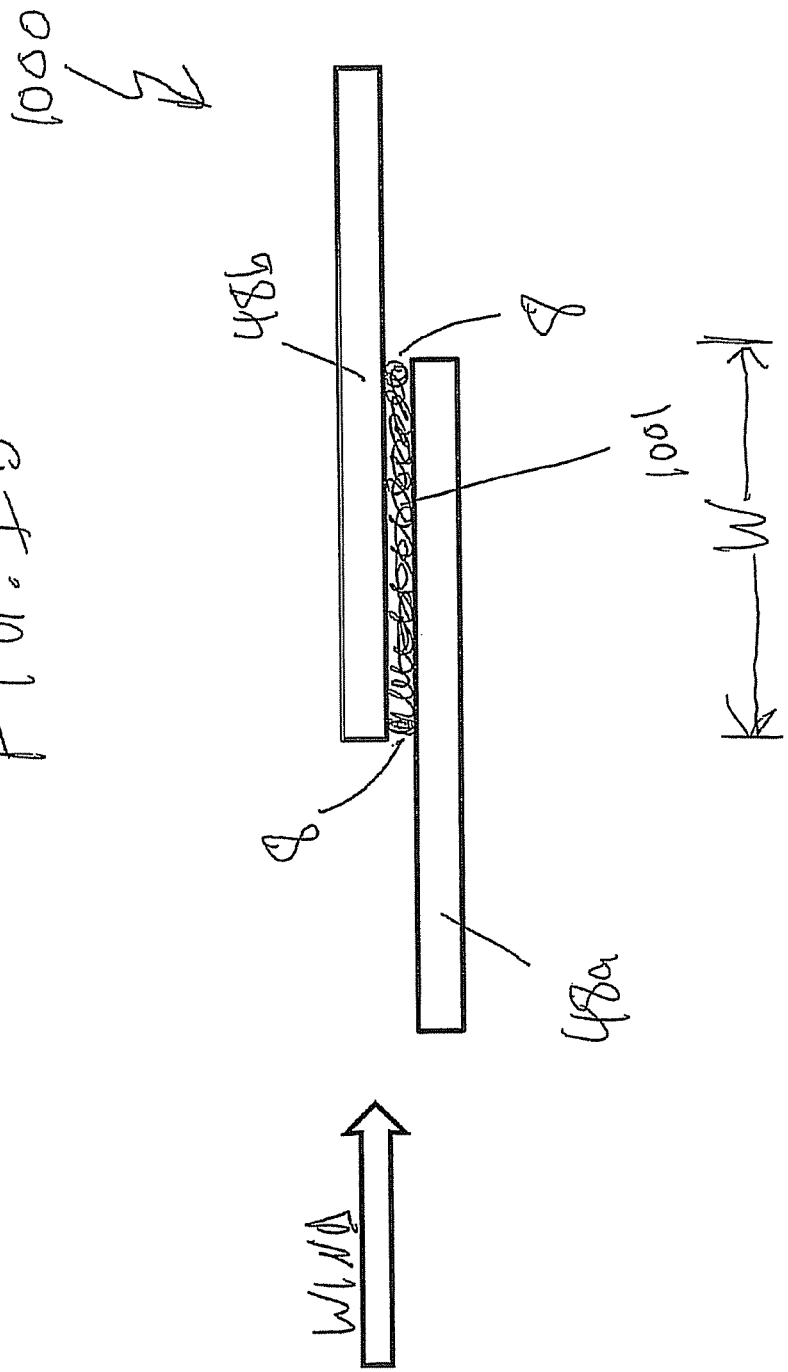

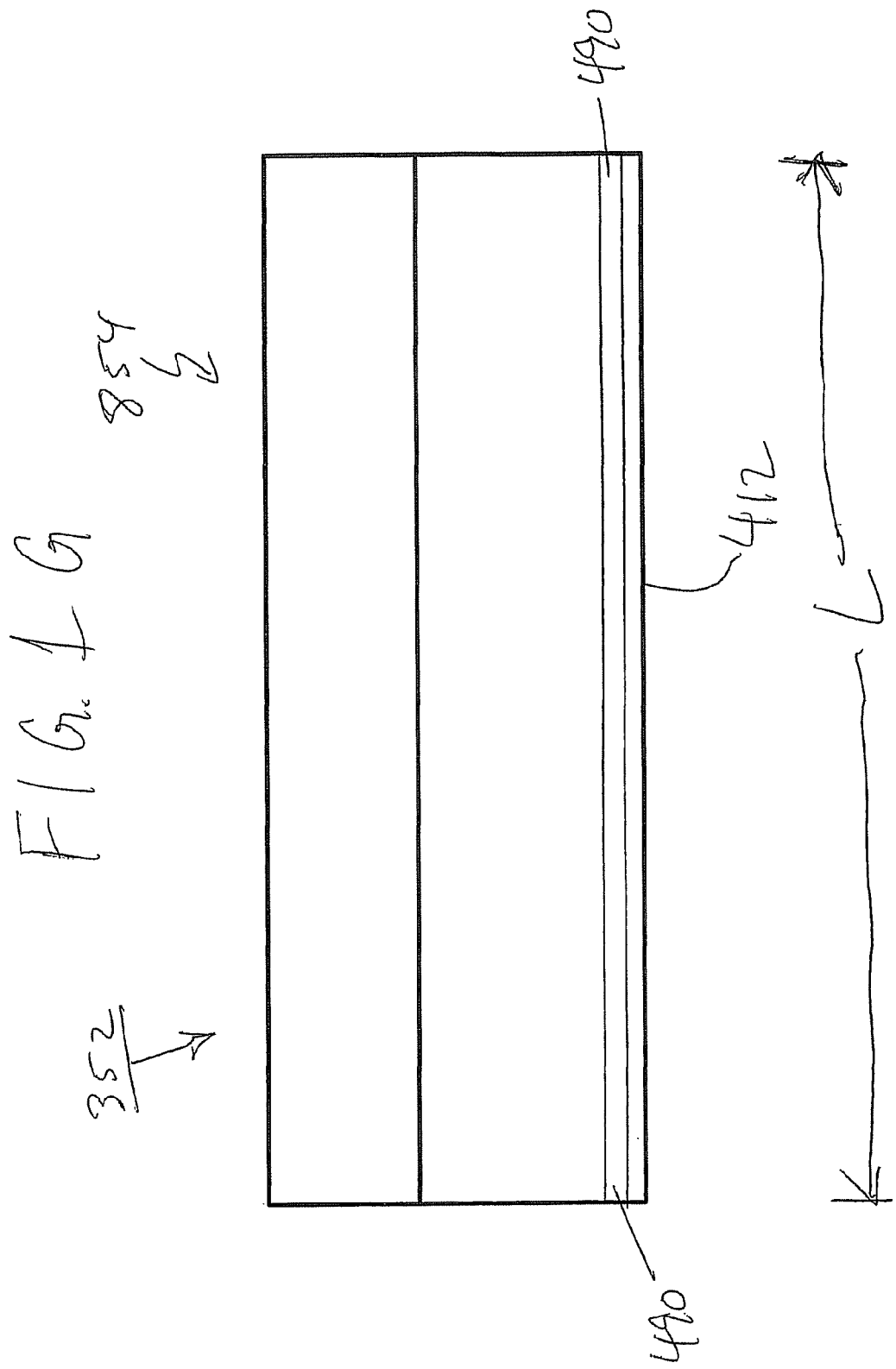

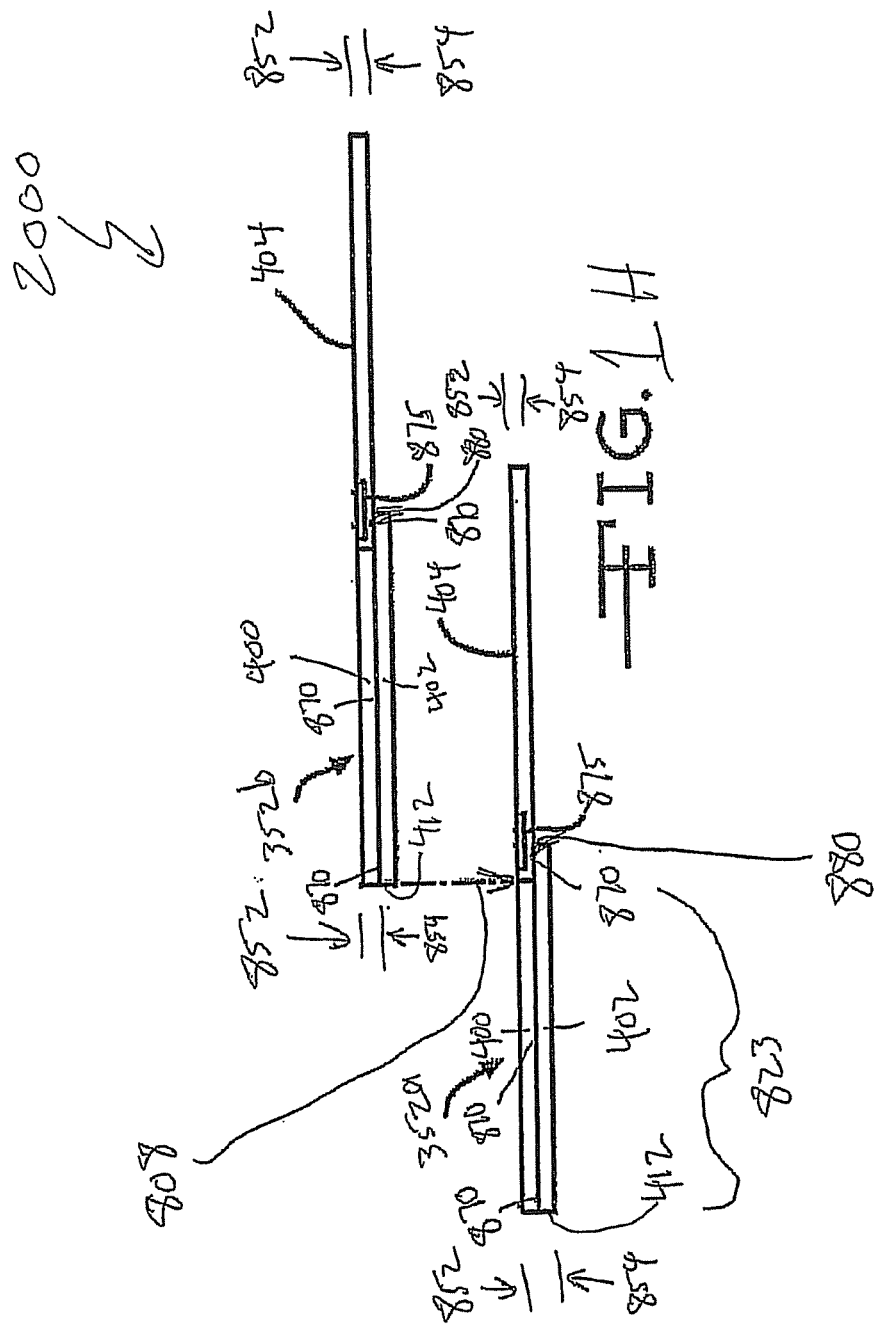

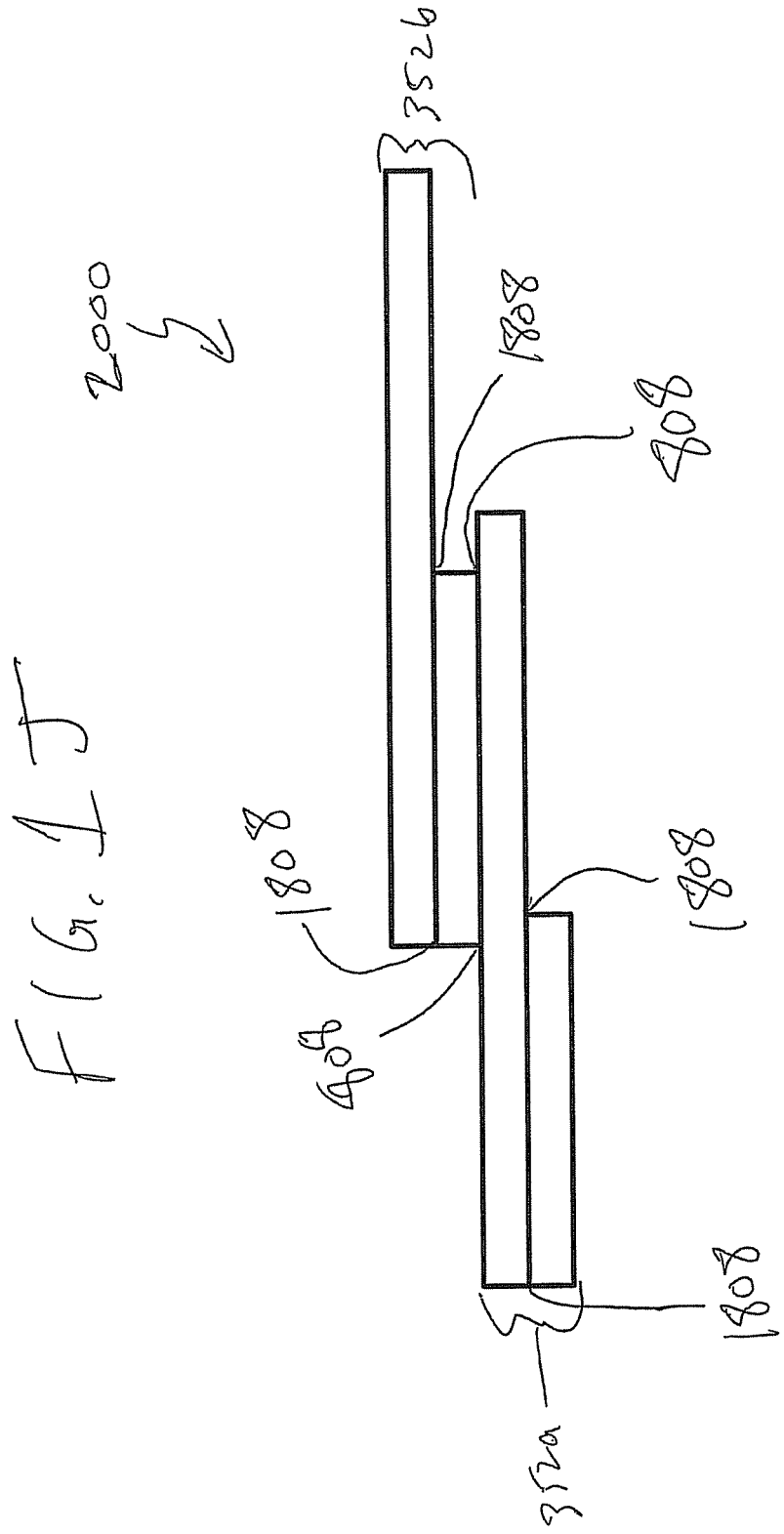

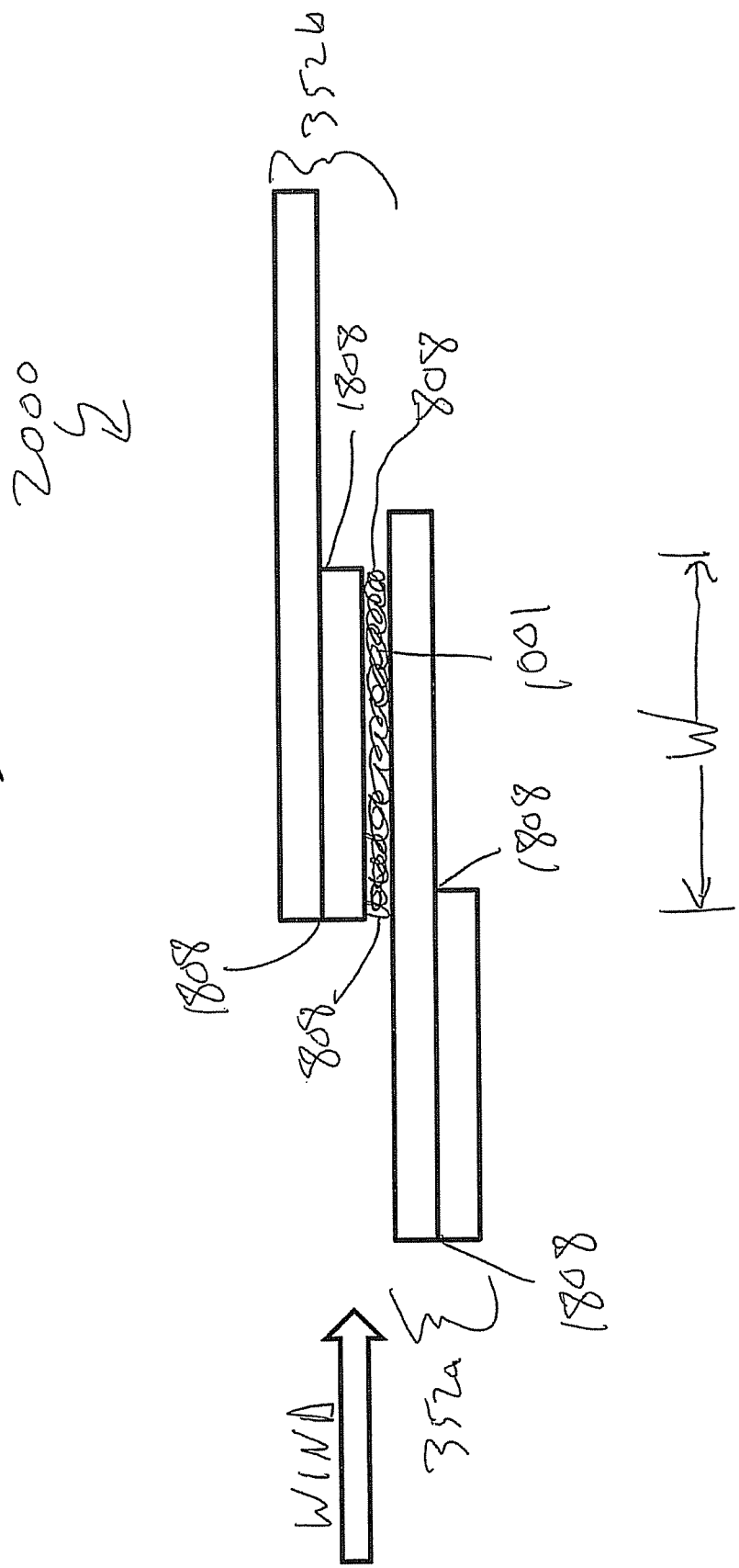

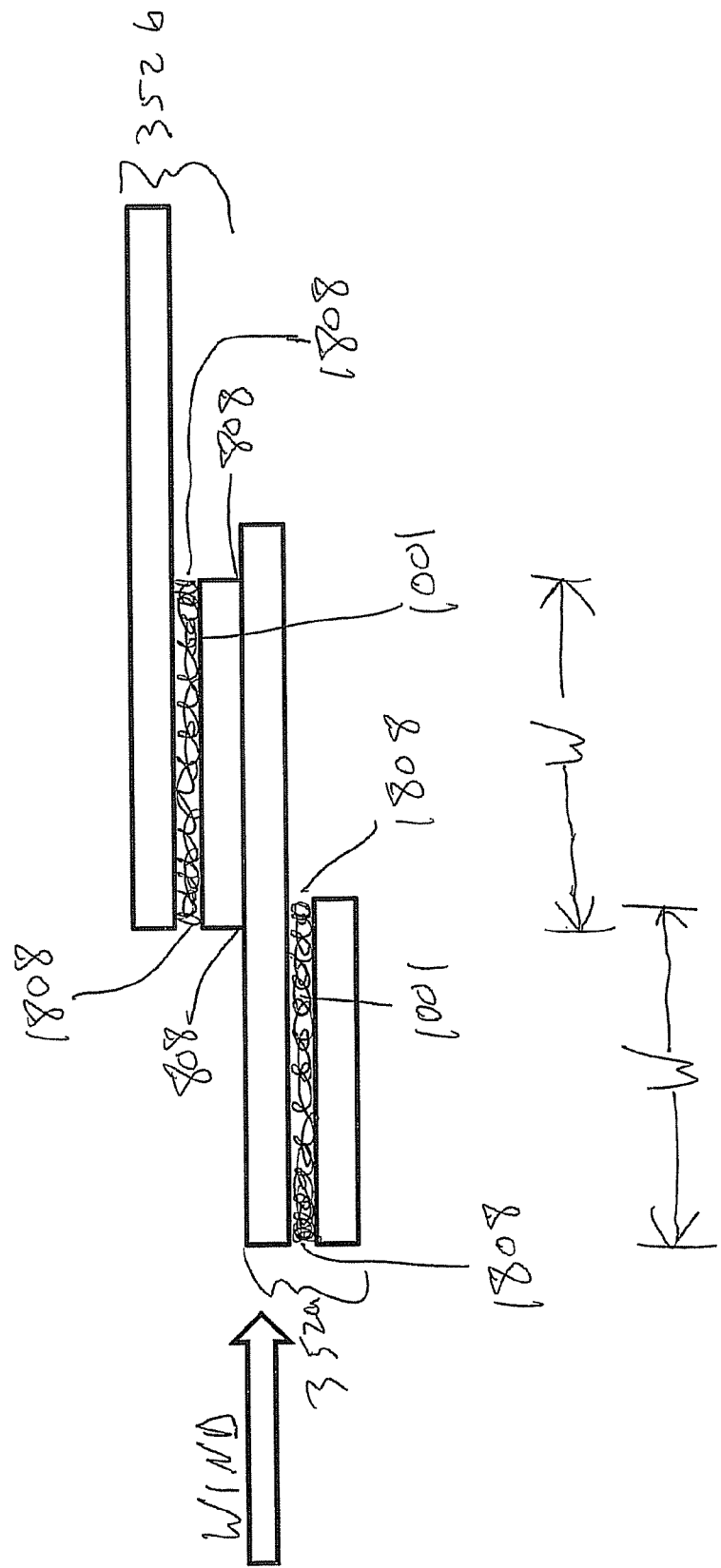

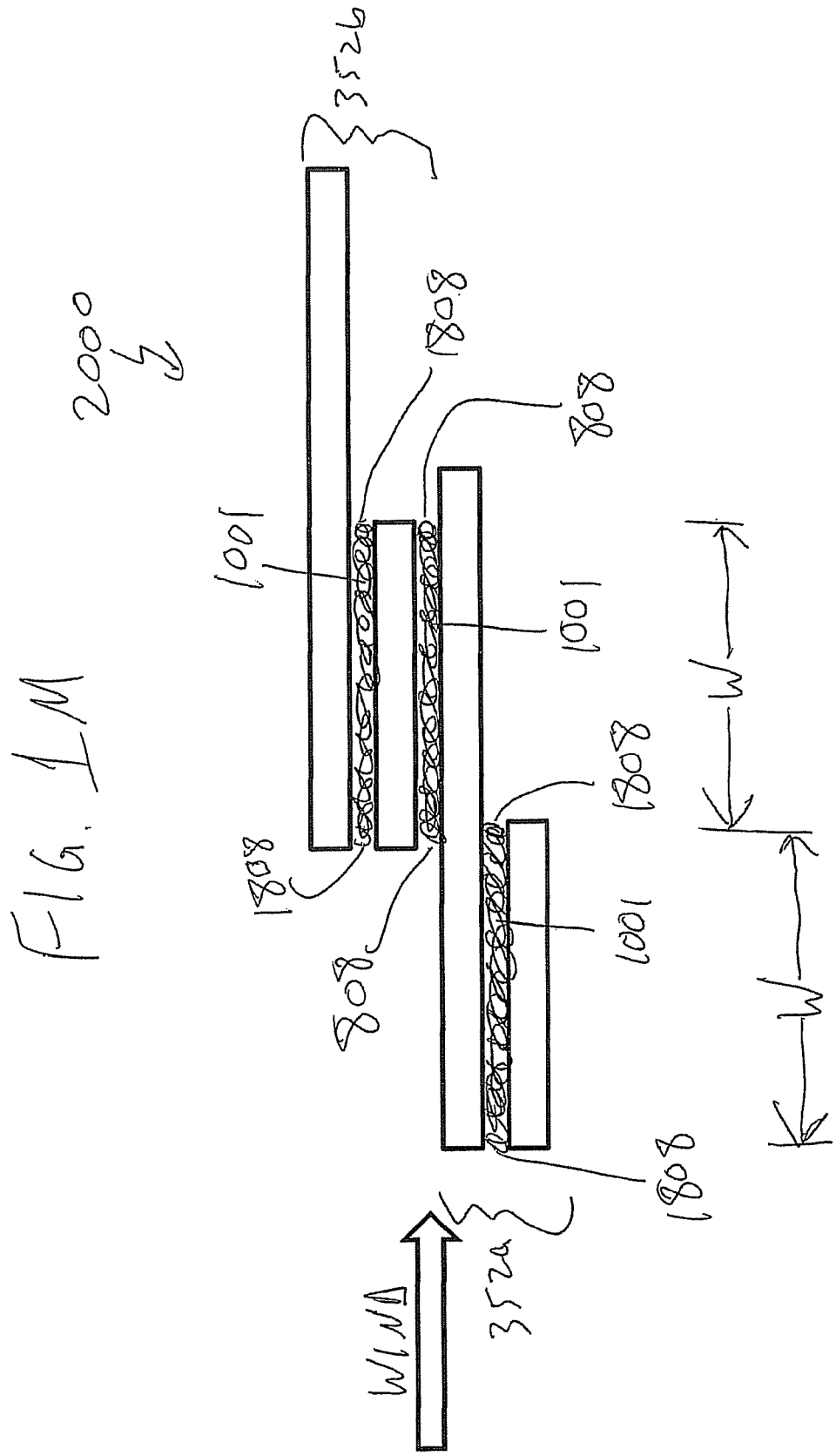

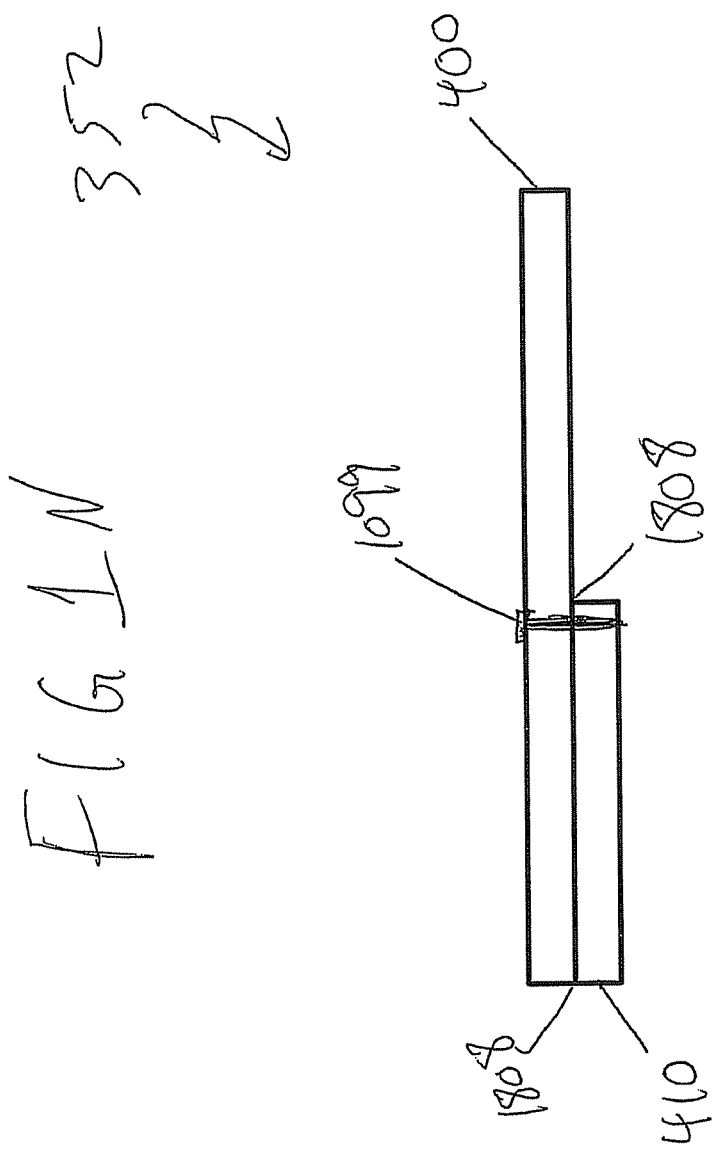

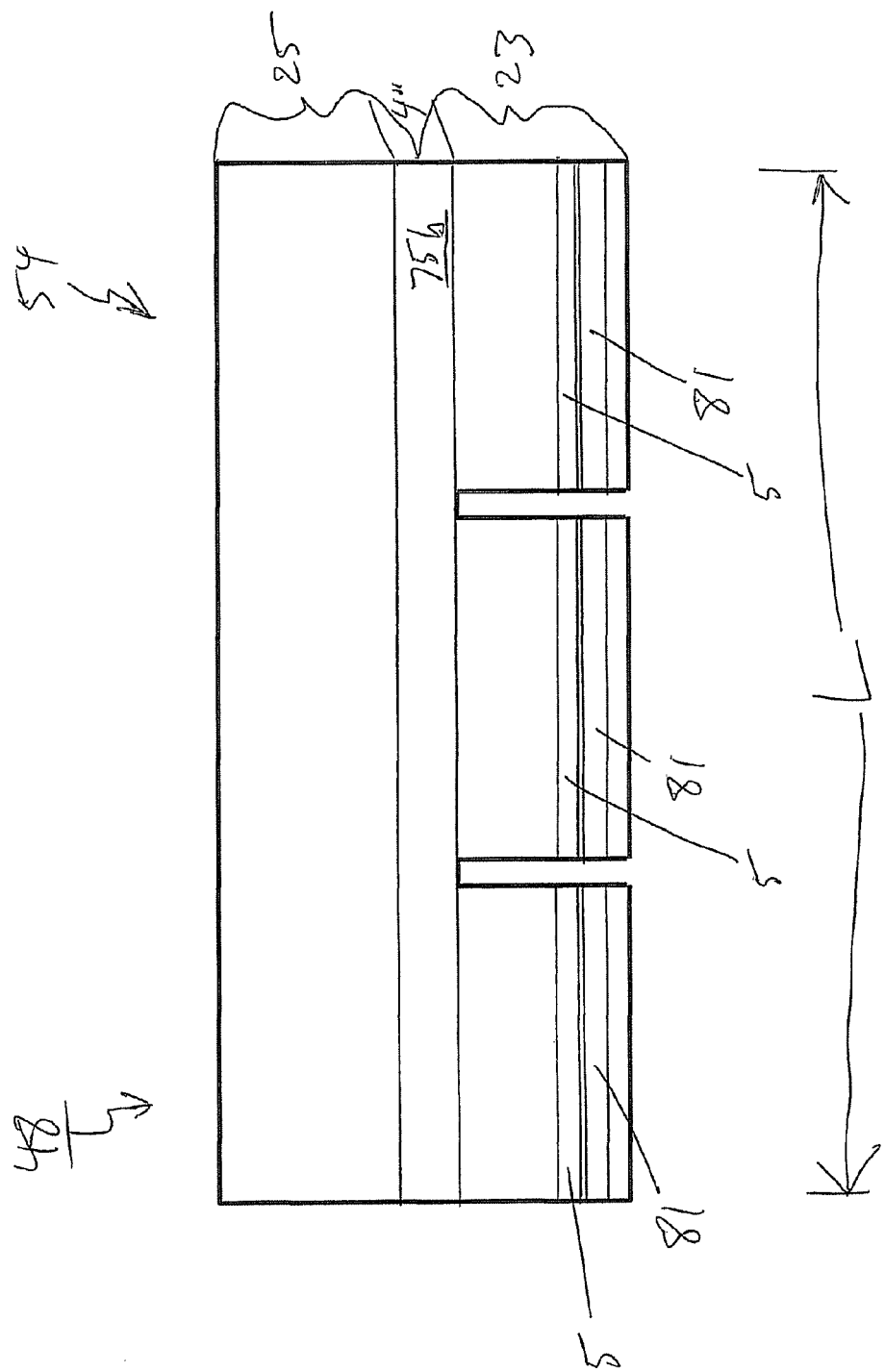

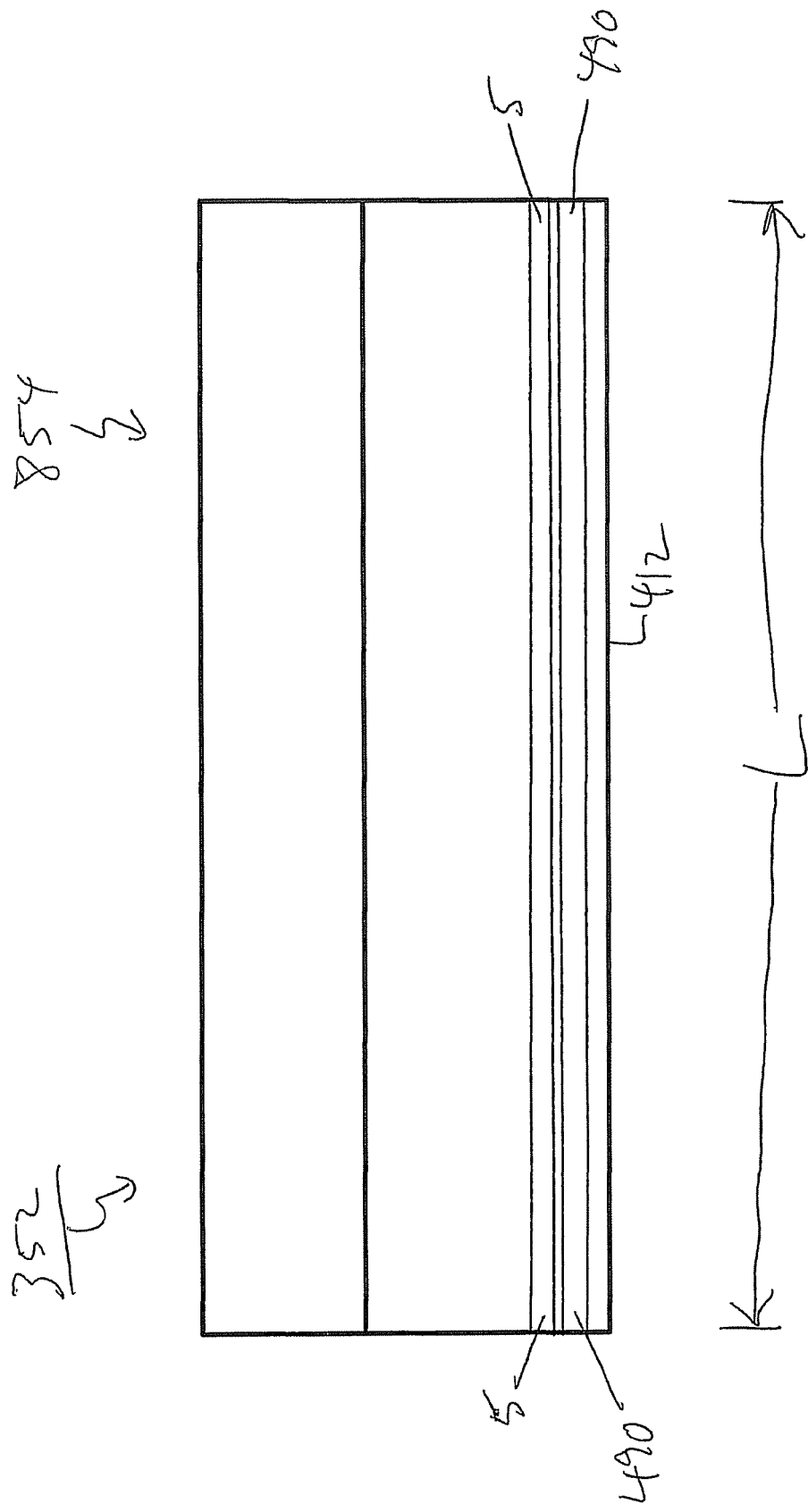

FIRE RETARDANT ROOFING SYSTEM, SHINGLE AND LAYER

RELATED APPLICATIONS

This application claims priority from provisional application No. 61/789,739 filed on Mar. 15, 2013, titled "Fire Retardant Roofing System, Shingle and Layer." Provisional application No. 61/789,739 is incorporated herein by reference in its entirety

FIELD

The disclosure is directed to fire retardant roofing shingle layers, roofing shingles comprising at least one of the fire retardant roofing shingle layers, and roofing systems comprising at least one of the roofing shingles.

BACKGROUND

While protecting a building from weather-related phenomena, roofing shingles are utilized to protect the building from fire as well. Roofing shingles sold in the United States are generally required to meet American Standard for Testing Materials ("ASTM") D3462, which requires Class A fire performance under ASTM E108 (i.e., Underwriters Laboratories ("UL") 790). ASTM E108 tests roof coverings against severe exposure to fire. Class A fire performance under ASTM E108 requires passage of a "burning brand test," which is meant to simulate a burning tree branch landing on a typical roof.

SUMMARY

In a first exemplary embodiment, the disclosure is directed to a layer of roofing shingle having an upper surface and an under surface. The layer comprises a fibrous substrate, an asphalt coating on the fibrous substrate, and granules disposed on the asphalt coating. The layer includes an expandable fire retardant material that has an average bulk density ranging from 1 to 3 $g/cm^3$ and a start expansion temperature ranging from 150 to 250° C. In certain exemplary embodiments, a roofing shingle comprises at least one layer as described.

In a second exemplary embodiment, the disclosure is directed to a roofing shingle having an upper surface and an under surface. The roofing shingle comprises a fibrous substrate, an asphalt coating on the fibrous substrate, and granules disposed on the asphalt coating. The roofing shingle includes a tape comprising an expandable fire retardant material that has an average bulk density ranging from 1 to 3 $g/cm^3$ and a start expansion temperature ranging from 150 to 250° C. In certain exemplary embodiments, the tape is adhered to the upper surface and/or the under surface of the roofing shingle.

In a third exemplary embodiment, the disclosure is directed to a roofing system comprising a plurality of partially overlapping courses of roofing shingles. The partially overlapping courses of roofing shingles create an overlapping seam. Each shingle comprises at least one layer comprising a fibrous substrate, an asphalt coating on the fibrous substrate, and granules disposed on the asphalt coating. When exposed to fire at a temperature of at least 150° C., a portion of a roofing shingle expands thereby closing the overlapping seam.

In a fourth exemplary embodiment, the disclosure is directed to a laminated roofing shingle having an upper surface and an under surface. The laminated roofing shingle comprises at least two layers bonded by an adhesive section. Each layer comprises a fibrous substrate, an asphalt coating on the fibrous substrate, and granules disposed on the asphalt coating. At least one of the layers includes expandable graphite that has an average bulk density ranging from 1.3 to 2.8 $g/cm^3$ and a start expansion temperature ranging from 150 to 250° C. The expandable graphite is located in an area within two inches of an adhesive section or a sealant section of the laminated roofing shingle.

BRIEF DESCRIPTION OF THE DRAWINGS

Various aspects and advantages of the present disclosure will become more readily apparent to those of ordinary skill in the relevant art after reviewing the following detailed description and accompanying drawings, wherein:

FIG. 1A illustrates a perspective view of an exemplary embodiment of a bundle of single layer roofing shingles of the present disclosure, having visible a major portion of an upper surface and a minor portion of an under surface of a single layer roofing shingle;

FIG. 1B illustrates a perspective view of an under surface of an exemplary embodiment of a single layer roofing shingle as illustrated in FIG. 1A;

FIG. 1C shows a side view of an exemplary embodiment of a roofing system of the present disclosure as illustrated by two single layer roofing shingles that overlap each other as if installed onto a roofing deck;

FIG. 1D shows a side view of an exemplary embodiment of a roofing system of the present disclosure as illustrated by two single layer roofing shingles that overlap each other as if installed onto a roofing deck and have been exposed to elevated temperatures and/or fire;

FIG. 1G illustrates a schematic plan view of an under surface of the exemplary embodiment of the laminated roofing shingle illustrated in FIGS. 1E and 1F;

FIG. 1H illustrates an exploded side view of an exemplary embodiment of a roofing system of the present disclosure as illustrated by two laminated roofing shingles that overlap each other as if installed onto a roofing deck;

FIG. 1J illustrates a side view of an exemplary embodiment of a roofing system of the present disclosure as illustrated by two laminated roofing shingles that overlap each other as if installed onto a roofing deck;

FIG. 1K illustrates a side view of an exemplary embodiment of a roofing system of the present disclosure as illustrated by two laminated roofing shingles that overlap each other as if installed onto a roofing deck and have been exposed to elevated temperatures and/or fire, where expandable fire retardant material is included with either or both laminated roofing shingles at an overlapping portion thereof such that the expandable fire retardant material expands in the overlapping seam between the laminated roofing shingles when exposed to elevated temperatures and/or fire;

FIG. 1L illustrates a side view of an exemplary embodiment of a roofing system of the present disclosure as illustrated by two laminated roofing shingles that overlap each other as if installed onto a roofing deck and have been exposed to elevated temperatures and/or fire, where expandable fire retardant material is included with either or both laminated roofing shingles within a laminated portion, such that the expandable fire retardant material expands between the laminated layers when exposed to elevated temperatures and/or fire;

FIG. 1M illustrates a side view of an exemplary embodiment of a roofing system of the present disclosure as illustrated by two laminated roofing shingles that overlap each other as if installed onto a roofing deck and have been exposed to elevated temperatures and/or fire, where expandable fire retardant material is included with either or both laminated roofing shingles at an overlapping portion thereof and within a laminated portion, such that the expandable fire retardant material expands in the overlapping seam between the laminated roofing shingles and between the laminated layers when exposed to elevated temperatures and/or fire;

FIG. 1N illustrates a side view of an exemplary embodiment of a laminated roofing shingle that incorporates a physical fastener at a common bond area;

FIG. 1P illustrates a perspective view of an under surface of an exemplary embodiment of a single layer roofing shingle as illustrated in FIG. 1A that includes an exemplary embodiment of a tape comprising expandable fire retardant material;

FIG. 1Q illustrates a perspective view of an under surface of an exemplary embodiment of a laminated roofing shingle as illustrated in FIGS. 1E and 1F that includes an exemplary embodiment of a tape comprising expandable fire retardant material;

DETAILED DESCRIPTION

Figure 1F:
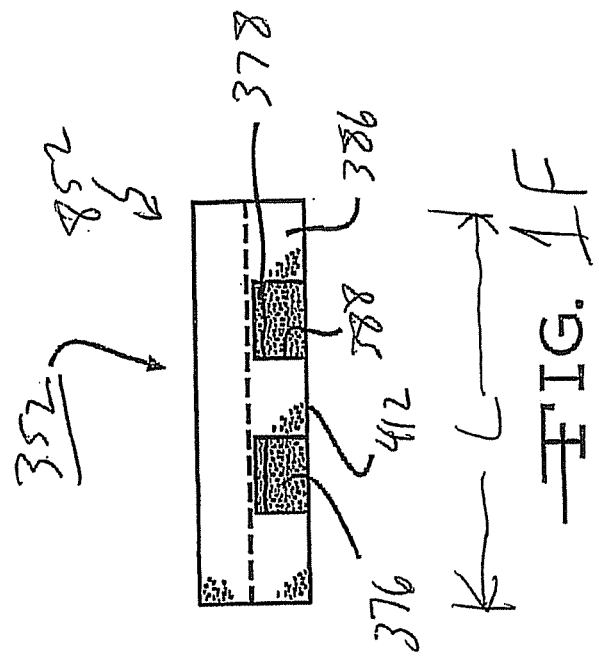
FIG. 1F illustrates a schematic plan view of an upper surface of the exemplary embodiment of the laminated roofing shingle illustrated in FIG. 1E.

While embodiments encompassing the general inventive concepts may take various forms, there is shown in the drawings and will hereinafter be described various embodiments with the understanding that the present disclosure is to be considered merely an exemplification and is not intended to be limited to the specific embodiments.

Unless defined otherwise, all technical and scientific terms used herein have the same meaning as commonly understood by one of ordinary skill in the art to which the disclosure belongs. In the drawings, the thickness of the lines, layers, and regions may be exaggerated for clarity. It is to be noted that like numbers found throughout the figures denote like elements. The terms "top," "bottom," "front," "back," "side," "upper," "under," and the like are used herein for the purpose of explanation only. It will be understood that when an element such as a layer, region, area, or panel is referred to as being "on" another element, it can be directly on the other element or intervening elements may be present. If an element or layer is described as being "adjacent to" or "against" another element or layer, it is to be appreciated that that element or layer may be directly adjacent to or directly against that other element or layer, or intervening elements may be present. It will also be understood that when an element such as a layer or element is referred to as being "over" another element, it can be directly over the other element, or intervening elements may be present.

As it pertains to the present disclosure, "expandable fire retardant material" refers to a composition that expands upon heating, which the expansion helps to prevent fire from spreading to a roofing deck located underneath roofing shingles.

As it pertains to the present disclosure, "start expansion temperature" refers to a temperature at which an expandable fire retardant material grows to at least 5 times its original volume in less than 3 minutes of exposure at the temperature.

As it pertains to the present disclosure, "expandable graphite" refers to any form of graphite that is capable of expanding at least 5 times its original volume when exposed to temperatures ranging from 150 to 250° C. and greater. One or more exemplary embodiments of expandable graphite are available as Nyagraph Expandable Graphite from Nyacol Nano Technologies, Inc., Ashland, Mass.; GRAFGUARD Expandable Graphite Flake from GrafTech International Holdings Inc., Lakewood, Ohio; FireCarb Expandable Graphite from Minelco, Inc., Cincinnati, Ohio; and Expandable Graphite SYZR from Sanyo Corporation of America, New York, N.Y.

As it pertains to the present disclosure, "nail line area" refers to a central portion of a roofing shingle approximately located where a headlap region of the roofing shingle and a prime region of the roofing shingle meet and overlap. The nail line area is the area of the roofing shingle where the roofing shingle is typically nailed to the roofing deck.

As it pertains to the present disclosure, "adhesive section" refers to any area of a laminated roofing shingle where adhesive is used to join two layers of a laminated roofing shingle. A non-limiting example of an adhesive section is a common bond area, which is described in more detail herein. In certain exemplary embodiments, a laminated roofing shingle comprises three adhesive sections, one of which is a common bond area. "Adhesive" and "adhesive material(s)" are used to refer to adhering individual layers of a laminated roofing shingle, while "sealant" (described below) is used to refer to affixing partially overlapping roofing shingles to one another.

As it pertains to the present disclosure, "common bond area" refers to the area of a laminated roofing shingle where a continuous bead of adhesive joins the overlay and the underlay. In certain exemplary embodiments of laminated roofing shingles, the common bond area is the nail line area.

As it pertains to the present disclosure, "sealant" refers to a substance used to seal partially overlapping roofing shingles or courses thereof so as to prevent the tabs from being lifted off the roof deck by wind.

As it pertains to the present disclosure, "overlapping seam" refers to a gap between two partially overlapping courses of roofing shingles.

As it pertains to the present disclosure, when dealing with concentrations of materials included in a roofing shingle, the term "square" refers to a "sales square," which is a common unit of roofing shingles. "Sales square" refers to an amount of shingles equal to 98.4 ft$^2$ of exposed shingle coverage of a roofing deck. A presently-available sales square of laminated roofing shingles weighs approximately 210 lbs.

In a first exemplary embodiment, the disclosure is directed to a layer of roofing shingle having an upper surface and an under surface. The layer comprises a fibrous substrate, an asphalt coating on the fibrous substrate, and granules disposed on the asphalt coating. The layer includes an expandable fire retardant material that has an average bulk density ranging from 1 to 3 g/cm$^3$ and a start expansion temperature ranging from 150 to 250° C. In certain exemplary embodiments, a roofing shingle comprises at least one layer as described.

In a second exemplary embodiment, the disclosure is directed to a roofing shingle having an upper surface and an under surface. The roofing shingle comprises a fibrous substrate, an asphalt coating on the fibrous substrate, and granules disposed on the asphalt coating. The roofing shingle includes a tape comprising an expandable fire retardant material that has an average bulk density ranging from 1 to 3 g/cm$^3$ and a start expansion temperature ranging from 150 to 250° C. In certain exemplary embodiments, the tape is adhered to the upper surface and/or the under surface of the roofing shingle.

In a third exemplary embodiment, the disclosure is directed to a roofing system comprising a plurality of partially overlapping courses of roofing shingles. The partially overlapping courses of roofing shingles create an overlapping seam. Each shingle comprises at least one layer comprising a fibrous substrate, an asphalt coating on the fibrous substrate, and granules disposed on the asphalt coating. When exposed to fire at a temperature of at least 150° C., a portion of a roofing shingle expands into the overlapping seam.

In a fourth exemplary embodiment, the disclosure is directed to a laminated roofing shingle having an upper surface and an under surface. The laminated roofing shingle comprises at least two layers bonded by an adhesive section. Each layer comprises a fibrous substrate, an asphalt coating on the fibrous substrate, and granules disposed on the asphalt coating. At least one of the layers includes expandable graphite that has an average bulk density ranging from 1.3 to 2.8 g/cm$^3$ and a start expansion temperature ranging from 150 to 250° C. The expandable graphite is located in an area within two inches of an adhesive section or a sealant section of the laminated roofing shingle.

The present disclosure relates to preventing formation of gaps between roofing shingles or layers thereof during a fire, or should such a gap form, filling at least a portion of the gap with expanded fire retardant material. The exemplary embodiments disclosed herein may be implemented to accomplish these goals.

In certain exemplary embodiments, the expandable fire retardant material has an average bulk density ranging from 1 to 3 g/cm$^3$. In certain exemplary embodiments, the expandable fire retardant material has an average bulk density ranging from 1.3 to 2.8 g/cm$^3$. In certain exemplary embodiments, the expandable fire retardant material has a start expansion temperature ranging from 150 to 250° C. In certain exemplary embodiments, the expandable fire retardant material has a start expansion temperature ranging from 150 to 180° C. In certain exemplary embodiments, the expandable fire retardant material is capable of expanding to a volume ranging from 5 to 400 times greater when exposed to start expansion temperatures for less than 3 minutes.

In certain exemplary embodiments, the expandable fire retardant material is present in a layer or roofing shingle in an amount ranging from 0.01 to 1 lb/square. In certain exemplary embodiments, the expandable fire retardant material is present in a layer or roofing shingle in an amount ranging from 0.04 to 0.5 lb/square. In certain exemplary embodiments, the expandable fire retardant material is present in a layer or roofing shingle in an amount ranging from 0.06 to 0.2 lb/square.

In certain exemplary embodiments, the expandable fire retardant material is included in the layer or roofing shingle as particulates. In certain exemplary embodiments, the particulates have an average particle size ranging from 0.1 to 1000 microns. In certain exemplary embodiments, the particulates have an average particle size ranging from 50 to 500 microns. In certain exemplary embodiments, the particulates have an average particle size ranging from 0.2 to 50 microns.

In certain exemplary embodiments, the expandable fire retardant material comprises at least one compound selected from the group consisting of: expandable graphite, ammonium polyphosphate, and combinations thereof. In certain exemplary embodiments, the expandable fire retardant material comprises expandable graphite. In certain exemplary embodiments, the expandable fire retardant material consists of expandable graphite. In certain exemplary embodiments, the expandable fire retardant material consists of ammonium polyphosphate.

Referring now to the drawings, FIG. 1A illustrates a perspective view of an exemplary embodiment of a bundle 50 of single layer roofing shingles 48 of the present disclosure. Visible is a major portion of an upper surface 52 and a minor portion of an under surface 54 of a single layer roofing shingle 48. FIG. 1B illustrates a perspective view of an under surface 54 of an exemplary embodiment of a single layer roofing shingle 48 as illustrated in FIG. 1A. Expandable fire retardant material (identified as numeral 99 in FIG. 2 and further described herein) is disposed on the single layer roofing shingle (i.e., layer) 48 in at least one of the following locations: upper surface 52 at a headlap region 25; under surface 54 at a tab region 23; upper surface 52 at a nail line area 75; under surface 54 just above a tab region 23 (e.g., at a nail line area 75b on the under surface); upper surface 52 or under surface 54 within two inches of a nail line area 75 (75b on the under surface); within two inches of a lower edge 80; under surface 54 within two inches of a seal area 81; and combinations thereof.

FIG. 1C shows a side view of an exemplary embodiment of a roofing system 1000 of the present disclosure as illustrated by two single layer roofing shingles 48a, 48b as disclosed herein and illustrated in FIGS. 1A and 1B that partially overlap each other as if installed onto a roofing deck, thereby creating an overlapping seam 8.

FIG. 1D shows a side view of an exemplary embodiment of a roofing system 1000 of the present disclosure as illustrated by two single layer roofing shingles 48a, 48b that overlap each other as if installed onto a roofing deck and have been exposed to fire at a temperature of at least 150° C., causing the expandable fire retardant material to expand (expanded fire retardant material is indicated using numeral 1001) into at least a portion of the overlapping seam 8. The arrow illustrates wind blowing toward the roofing system 1000. While the embodiment illustrated in FIG. 1D shows expanded fire retardant material 1001 filling the entire width W of the overlapping seam 8, it will be appreciated that the expandable fire retardant material may be present in either or both single layer roofing shingles 48a, 48b such that the expanded fire retardant material 1001 fills only a portion of the width W of the overlapping seam 8.

Figure 1E:
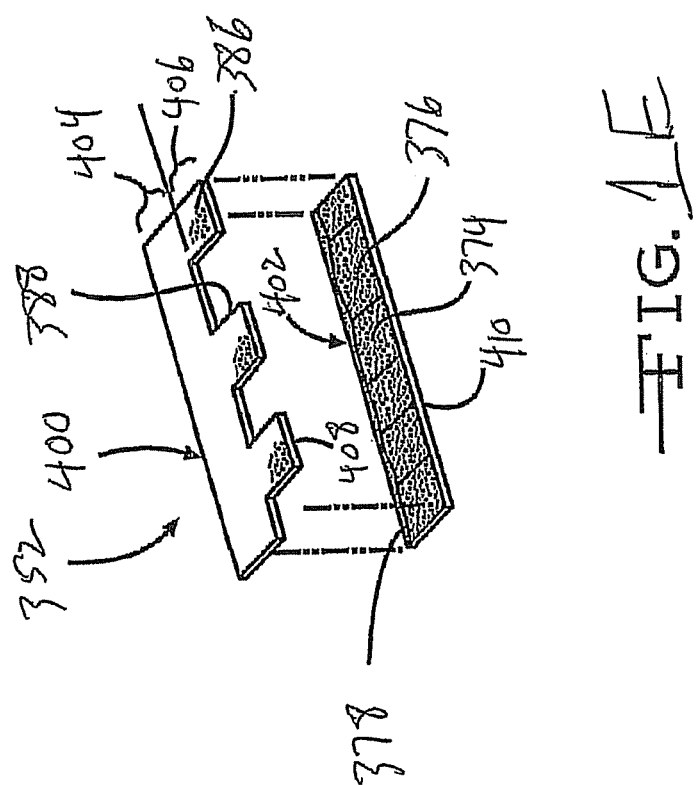
FIG. 1E illustrates an exploded schematic perspective view of an exemplary embodiment of a laminated roofing shingle of the present disclosure.

FIGS. 1E, 1F, and 1G illustrate various views of an exemplary embodiment of a laminated roofing shingle. FIG. 1E is an exploded schematic perspective view of an exemplary embodiment of a laminated roofing shingle 352 of the present disclosure. FIG. 1F is a schematic plan view of an upper surface 852 of the exemplary embodiment of the laminated roofing shingle 352 illustrated in FIG. 1E. FIG. 1G is a schematic plan view of an under surface 854 of the exemplary embodiment of the laminated roofing shingle 352 illustrated in FIGS. 1E and 1F.

Figure 3:
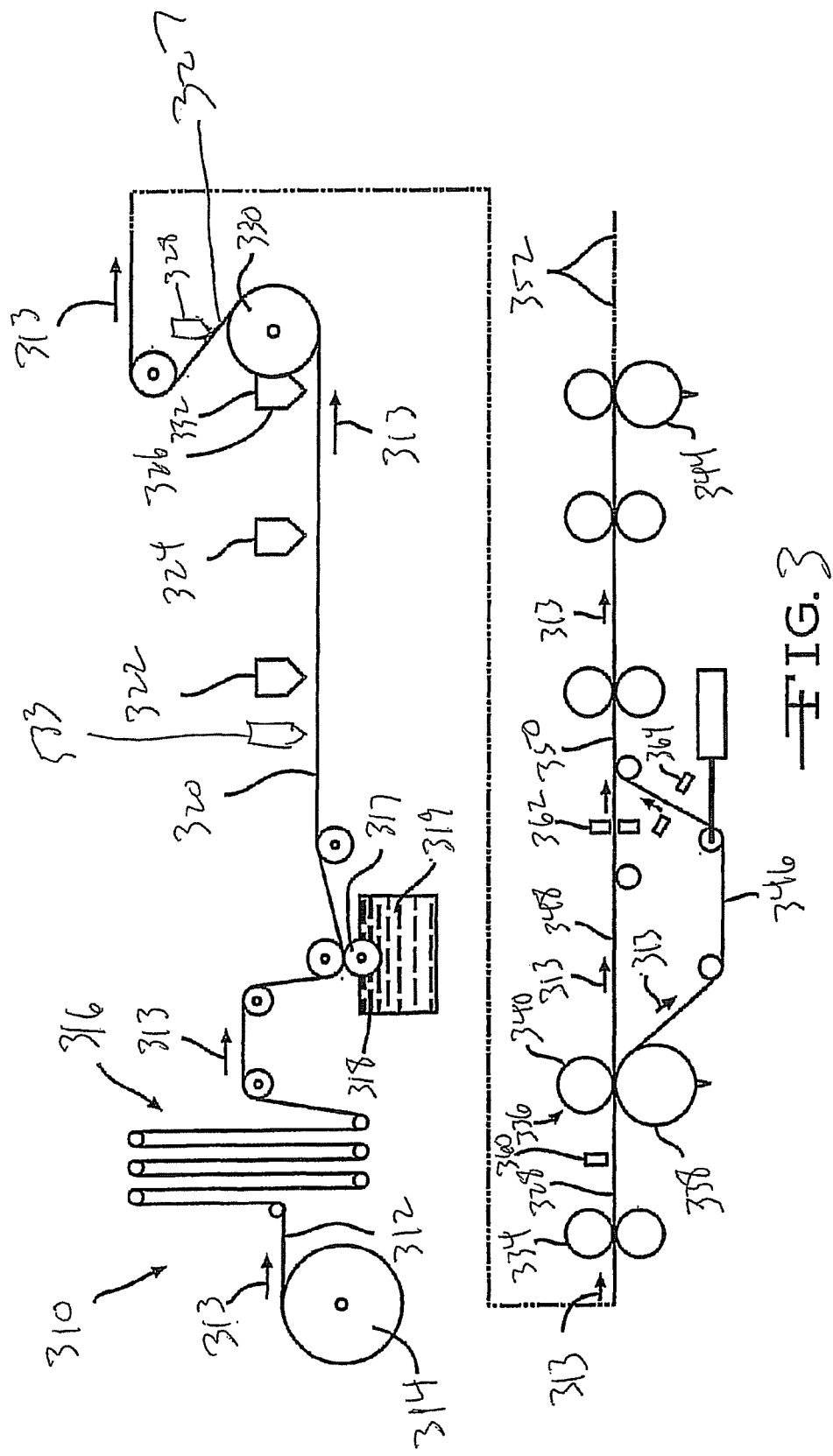
FIG. 3 illustrates a schematic view in elevation of an exemplary embodiment of an apparatus for manufacturing a laminated roofing shingle that includes an expandable fire retardant material.
Figure 4:
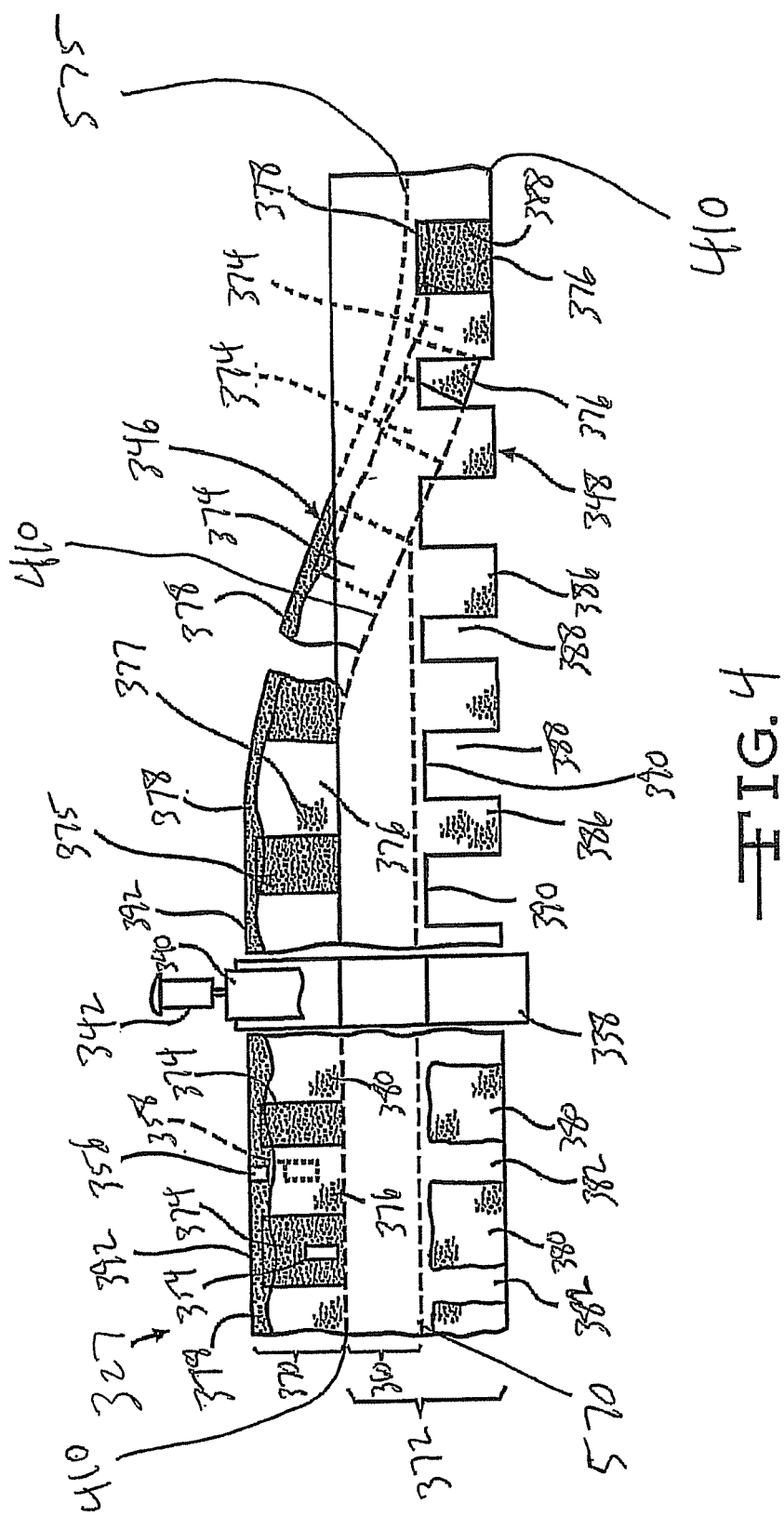
FIG. 4 illustrates a plan view of a portion of the exemplary embodiment of the apparatus illustrated in FIG. 3, showing the laminating of the continuous underlay sheet beneath the continuous overlay sheet to make shingle overlay to form a continuous laminated sheet.

A laminated roofing shingle 352 formed, for example, by the process illustrated in FIGS. 3 and 4 may include an overlay 400 and an underlay 402. The overlay 400 includes an upper or headlap portion 404, and a lower prime or butt portion 406. The butt portion 406 includes a repeated pattern of the tabs 386 and cutouts 388. A rear surface of the overlay 400 and a front surface of the underlay 402 are fixedly attached to each other to form the laminated roofing shingle 352. Such attachment can be accomplished by using one or more adhesive materials applied to the rear surface of the overlay 400 and/or the front surface of the underlay 402. In the illustrated embodiment, a butt edge 408 of the butt portion 406 of the overlay 400 and a lower edge 410 of the underlay 402 are vertically aligned to define a lower edge 412 of the laminated roofing shingle 352. If desired, a bead of sealant may be applied to the under surface 854 of the underlay 402 at, for example, a sealant area 490.

FIG. 1H shows an exploded side view of an exemplary embodiment of a roofing system 2000 of the present disclosure as illustrated by two laminated roofing shingles 352a, 352b that partially overlap each other as if installed on a roof, creating an overlapping seam 808. The laminated roofing shingles 352a, 352b includes an expandable fire retardant material as described herein. The expandable fire retardant material is located on the laminated roofing shingle 352 (e.g., 352a, 352b) so as to expand into at least a portion of the overlapping seam 808 when the roofing shingles 352 are exposed to fire at a temperature of at least 150° C.

The laminated roofing shingles 352 (e.g., 352a, 352b, etc.) may include expandable fire retardant material at one or more of several locations, including but not limited to the following: upper surface 852 at a headlap region 404; under surface 854 of an underlay 402; upper surface 852 within two inches of a nail line area 875; under surface 854 within two inches above a tab region 823; between overlay 400 and underlay 410 (i.e., so as to expand in at least a portion of the lamination seam 1808); upper surface 852, under surface 854, or between overlay 400 and underlay 410 (i.e., so as to expand in at least a portion of the lamination seam 1808) within two inches of a common bond area 880; under surface 854 within two inches of a lower edge 412; under surface 854 within two inches of a sealant area 490; and combinations thereof. A sealant may be disposed between partially overlapping courses at, for example, a sealant area 490 to provide some sealing between partially overlapping shingles 352a, 352b in order to prevent wind blowing the overlapping courses apart.

In certain exemplary embodiments, the expandable fire retardant material is applied continuously or substantially continuously in one or more of the several locations across the length L of a single layer roofing shingle 48 (e.g., FIGS. 1A and 1B) or a laminated roofing shingle 352 (e.g., FIGS. 1F and 1G). In other exemplary embodiments, the expandable fire retardant material is applied intermittently across the length L of a single layer roofing shingle 48 (e.g., FIGS. 1A and 1B) or a laminated roofing shingle 352 (e.g., FIGS. 1F and 1G).

FIG. 1J illustrates a side view of an exemplary embodiment of a roofing system 2000 of the present disclosure as illustrated by two laminated roofing shingles 352a, 352b as disclosed herein and illustrated in FIGS. 1E-1H, having lamination seams 1808. The two laminated roofing shingles 352a, 352b partially overlap each other as if installed onto a roofing deck, creating an overlapping seam 808.

FIG. 1K illustrates a side view of an exemplary embodiment of a roofing system 2000 of the present disclosure as illustrated by two laminated roofing shingles 352a, 352b that partially overlap each other as if installed onto a roofing deck and having been exposed to elevated temperatures and/or fire. Expandable fire retardant material is included with either or both laminated roofing shingles 352a, 352b at an overlapping portion thereof such that the expandable fire retardant material expands into at least a portion of the overlapping seam 808 when exposed to fire at a temperature of at least 150° C. (expanded fire retardant material is indicated by numeral 1001). The arrow illustrates wind blowing toward the roofing system 2000. While the embodiment illustrated in FIG. 1K shows expanded fire retardant material 1001 filling the entire width W of the overlapping seam 808, it will be appreciated that the expandable fire retardant material may be present in either or both laminated roofing shingles 352a, 352b such that the expanded fire retardant material 1001 fills only a portion of the width W of the overlapping seam 808.

FIG. 1L illustrates a side view of an exemplary embodiment of a roofing system 2000 of the present disclosure as illustrated by two laminated roofing shingles 352a, 352b that partially overlap each other as if installed onto a roofing deck and having been exposed to elevated temperatures and/or fire. Expandable fire retardant material is included with either or both laminated roofing shingles 352a, 352b at laminated portion (i.e., tab region 823) such that the expandable fire retardant material expands into at least a portion of the lamination seams 1808 when exposed to fire at a temperature of at least 150° C. (expanded fire retardant material is indicated by numeral 1001). The arrow illustrates wind blowing toward the roofing system 2000. While the embodiment illustrated in FIG. 1L shows expanded fire retardant material 1001 filling the entire width W of the lamination seams 1808, it will be appreciated that the expandable fire retardant material may be present in the laminated roofing shingles 352a, 352b such that the expanded fire retardant material 1001 fills only a portion of the width W of the lamination seams 1808.

FIG. 1M illustrates a side view of an exemplary embodiment of a roofing system 2000 of the present disclosure as illustrated by two laminated roofing shingles 352a, 352b that partially overlap each other as if installed onto a roofing deck and having been exposed to elevated temperatures and/or fire. Expandable fire retardant material is included with either or both laminated roofing shingles 352a, 352b at an overlapping portion thereof and a laminated portion (i.e., tab region 823) such that the expandable fire retardant material expands into at least a portion of the overlapping seam 808 and at least a portion of the lamination seams 1808 when exposed to fire at a temperature of at least 150° C. (expanded fire retardant material is indicated by numeral 1001). The arrow illustrates wind blowing toward the roofing system 2000. While the embodiment illustrated in FIG. 1K shows expanded fire retardant material 1001 filling the entire width W of the overlapping seam 808 and the lamination seams 1808, it will be appreciated that the expandable fire retardant material may be present in either or both laminated roofing shingles 352a, 352b such that the expanded fire retardant material 1001 fills only a portion of the width W of the overlapping seam 808, and/or present in the laminated roofing shingles 352a, 352b such that the expanded fire retardant material 1001 fills only a portion of the width W of the lamination seams 1808.

In addition to or in substitution of an adhesive area and/or expandable fire retardant material, one or more physical fasteners 1099 may be incorporated into the laminated roofing shingle 352 attempting to prevent the overlay 400 and the underlay 410 from separating at the lamination seam 1808, as illustrated in FIG. 1N. For example, a nail pattern that includes at least six nails that are approximately evenly spaced and nailed through both layers may provide benefit in preventing separation of the overlay 400 and the underlay 410 at the lamination seam. Other non-limiting examples of physical fasteners 1099 that may assist in preventing delamination include stitching (i.e., sewing) with a thread-like material, staples, rivets, or otherwise fasteners that physically fasten the layers together. In certain exemplary embodiments, the one or more physical fasteners 1099 are applied to the laminated roofing shingle 352 at or near a common bond area 880.

In certain exemplary embodiments, the expandable fire retardant material is included in a tape. The tape may be adhered to the roofing shingle during its manufacturing or at a point in time subsequent to its manufacture. The tape may be adhered in any of the locations related to placement of the expandable fire retardant material identified in the present disclosure. The tape may be woven or film, and the expandable fire retardant material may be incorporated into the tape material, an adhesive layer disposed onto the tape material, or a non-adhesive coating of the tape material. In certain exemplary embodiments, the tape may comprise from 0.01 to 10 percent by weight expandable fire retardant material, or 0.1 to 5 percent by weight expandable fire retardant material.

FIG. 1P illustrates a perspective view of an under surface 54 of an exemplary embodiment of a single layer roofing shingle 48 as illustrated in FIG. 1A that includes an exemplary embodiment of a tape 5 comprising expandable fire retardant material. As illustrated in FIG. 1P, the tape 5 may be affixed to the under surface 54 of the single layer roofing shingle 48 just above and within two inches of a sealant area 81. While the illustrated embodiment shows the tape 5 spanning the length L of the single layer roofing shingle 48 (excepting the cut out portions between the tabs), it is to be appreciated that the tape 5 may be affixed, for example, intermittently as opposed to continuous strips. It is also to be appreciated that the sealant area 81 may be located on an upper surface 52 (see FIG. 1A) of a single layer roofing shingle 48, particularly at a headlap area 25, and that the tape 5 may be affixed within two inches of such a sealant area 81. It is also to be appreciated that the tape 5 may be affixed in one or more locations on the single layer roofing shingle 48 instead of or in addition to the illustrated location.

FIG. 1Q illustrates a perspective view of an under surface 854 of an exemplary embodiment of a laminated roofing shingle 352 as illustrated in FIGS. 1E and 1F that includes an exemplary embodiment of a tape 5 comprising expandable fire retardant material. As illustrated in FIG. 1Q, the tape 5 may be affixed to the under surface 854 of the laminated roofing shingle 48 just above and within two inches of a sealant area 490. While the illustrated embodiment shows the tape 5 spanning the length L of the laminated roofing shingle 352, it is to be appreciated that the tape 5 may be affixed, for example, intermittently as opposed to a continuous strip. It is also to be appreciated that the tape 5 may be affixed in one or more locations on the laminated roofing shingle 352 instead of or in addition to the illustrated location.

In certain exemplary embodiments, the expandable fire retardant material is included in a coating that is applied to the layer or roofing shingle (single layer or laminated). An example of a coating is a paint.

Figure 2:
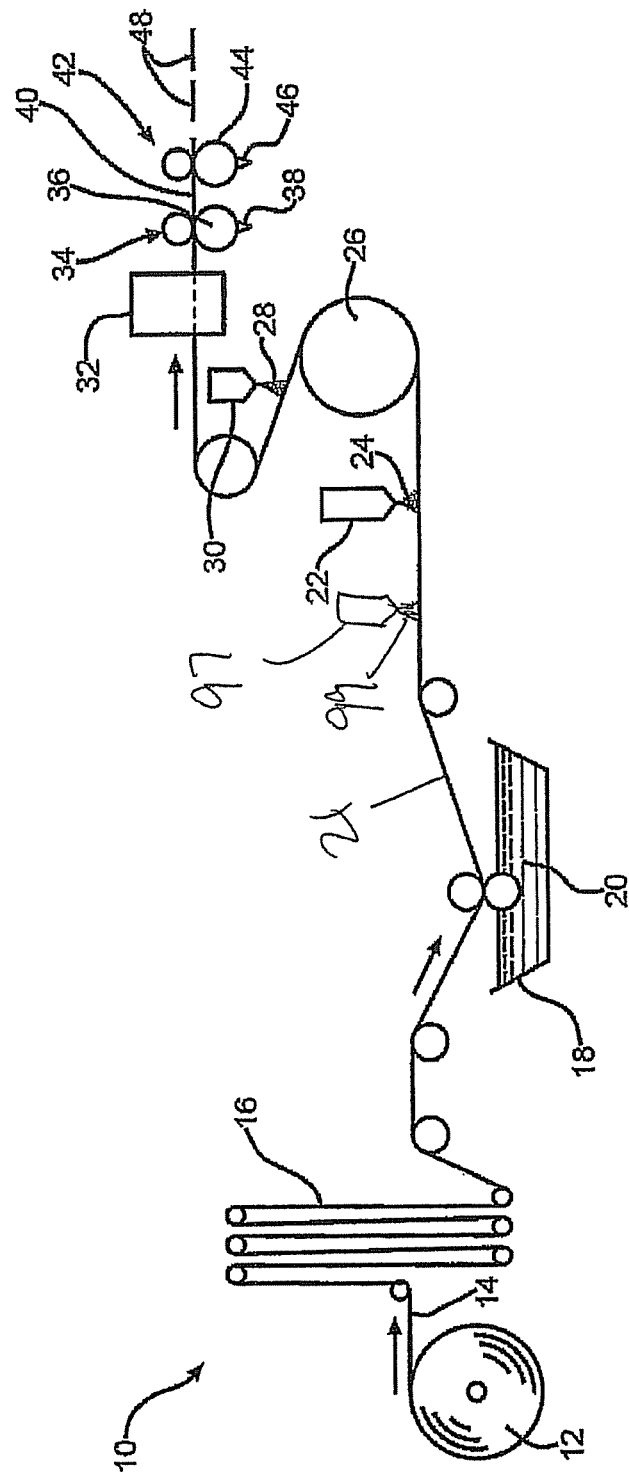
FIG. 2 illustrates a schematic elevational view of an exemplary embodiment of an apparatus for manufacturing roofing shingles that include expandable fire retardant material.

FIG. 2 illustrates an exemplary embodiment of an apparatus 10 for manufacturing layers 48 of roofing shingle that include an expandable fire retardant material 99. In certain exemplary embodiments, the roofing shingle consists of one layer 48. In certain exemplary embodiments, the roofing shingle consists of a plurality of layers 48. In certain exemplary embodiments, the roofing shingle consists of two layers 48. In certain exemplary embodiments consisting of a plurality of layers 48, the layers 48 may consist of essentially the same several ingredients. Although a portion of the Detailed Description illustrates three-tab roofing shingles (i.e., layers 48 as illustrated in FIG. 1A), the disclosure is applicable to further discusses other types of roofing shingles, particularly laminated roofing shingles 352 (e.g., FIGS. 1E-1M).

Initially, a fibrous substrate is payed out from a roll 12 as a continuous sheet 14. The fibrous substrate can be any type of material known for use in reinforcing roofing shingles, such as a web, scrim or felt of fibrous materials such as mineral fibers, cellulose fibers, rag fibers, mixtures of mineral and synthetic fibers, or the like. In certain embodiments, the substrate is a nonwoven web of glass fibers.

The continuous sheet 14 is passed from the roll through an accumulator 16. The accumulator allows time for splicing one roll of mat to another, during which time the mat within the accumulator is fed to the manufacturing process so that the splicing does not interrupt manufacturing.

Next, the continuous sheet 14 is passed through a coater 18 where an organic-based coating material 20 is applied to the sheet 14. The coating material 20 can be applied in any suitable manner. In the illustrated embodiment, the sheet 14 is coated with a supply of hot, molten coating material 20 to completely cover the sheet 14 with the tacky coating material 20. However, in other embodiments, the coating material 20 can be sprayed on, rolled on, or applied to the sheet 14 by other technique.

The term "organic-based coating material" refers to a coating material containing a substantial quantity of an organic material such as a bituminous material and/or a polymeric material. Any type of bituminous material suitable for coating roof coverings can be used, such as asphalt, tar, pitch, or a mixture thereof, which are all generically referred to herein as "asphalt." The asphalt can be either a manufactured asphalt produced by refining petroleum or by other methods, or a naturally occurring asphalt. The coating material can also include various additives and/or modifiers, such as inorganic fillers or mineral stabilizers. In a typical asphalt roofing shingle (or layer thereof), the coating material includes asphalt and a filler of finely ground inorganic particulate matter, such as pulverized limestone, in an amount ranging from about 40% to about 80% by weight of the coating material.

In certain embodiments, the filler can comprise granules, which may be low density granules as described in U.S. Pat. No. 7,805,909 to Teng et al., the disclosure of which is herein incorporated by reference in its entirety.

The hot coated sheet 21 is passed beneath an expandable fire retardant applicator 97 that discharges an expandable fire retardant material 99, which is illustrated as preceding a granule applicator 22. However, one or more expandable fire retardant applicator 97 may be positioned prior to, following, or in between one or more granule applicators for disposing the expandable fire retardant material 99 onto an upper surface of the coated sheet 21. One or more expandable fire retardant applicators 97 may be located at or near a backdust applicator 30 such that the expandable fire retardant material 99 is discharged onto an under surface 54 of the coated sheet 21. The expandable fire retardant material 99 may be discharged in combination with granules 24 or backdust 28, and the expandable fire retardant material 99 may be discharged in combination with granules 24 via granule applicator 22, or backdust 28 via backdust applicator 30, both of which are described in more detail below.

The hot coated sheet 21 is passed beneath a series of granule applicators 22 that discharge granules 24 onto the top surface of the sheet 21. The granules 24 may be of different sizes and/or densities, which is indicated in FIG. 1A by the incorporation of circles and dots on the upper surface 52 of the layer 48. One preferred granule applicator 22 is a granule valve of the type disclosed in U.S. Pat. No. 6,610,147 to Aschenbeck, the disclosure of which is herein incorporated by reference in its entirety.

As schematically illustrated in FIG. 1A, the granules 24 may comprise at least two types: i) prime roofing granules that are applied to the prime area 23 portion of the shingle that will be exposed on the roof and, ii) headlap roofing granules, applied in the headlap area 25, preferably of low density, that are applied to the portion of the shingle that will be normally substantially covered on the roof.

The prime granules generally provide the shingle with desired performance characteristics related to weatherability and aesthetics, while the headlap granules generally keep adjacent shingles from sticking together and provide similar performance characteristics where exposed (for example between the tabs of a strip shingle). Preferred headlap granules are of low density. However, the prime granules may also be made of low density materials that have a specific gravity less than 2.3 or an apparent density less than 70 lbs/ft$^3$.

The granule coated sheet is passed around a drum 26 that presses the granules 24 into the hot, tacky coating material and inverts the sheet sufficiently for any non-adhering roofing granules to fall into a hopper (not shown) for recycling. While the sheet is inverted, a backdust 28 may be applied to the back surface 54 of the sheet. For the illustrated exemplary embodiment, the backdust 28 is supplied from a backdust applicator 30. In certain embodiments, the backdust 28 comprises low density granules. In certain exemplary embodiments, the backdust 28 is blended with expandable fire retardant material and applied along with at least a portion of the backdust 28. In certain exemplary embodiments, the backdust 28 is applied separate from any expandable fire retardant material.

Next, the sheet is passed through a cooling section 32 in which the coating material is cooled. Any suitable type of cooling section can be used. In a typical cooling section, the sheet is passed up and down between a number of rolls and sprayed with water and/or exposed to cooling air to cool the coating material.

The sheet is fed through a pattern cutter 34, which in certain exemplary embodiments comprises a rotary cutter including a cutting cylinder 36 having a cutting knife 38 or blade. The pattern cutter cuts the sheet into multiple continuous strips 40 of shingles (one of which is shown), and cuts a series of cutouts and notches in each of the strips. For the illustrated embodiment, each of the strips 40 is fed through a length cutter 42 which includes a cutting cylinder 44 having a cutting knife 46. The length cutter cuts the strip into layers 48, which in certain embodiments are roofing shingles. Finally, the layers or roofing shingles 48 are stacked in a bundle 50 and packaged using suitable equipment (not shown).

FIG. 1A further illustrates a bundle 50 of single-layer roofing shingles 48. As schematically illustrated in FIG. 1A, the granules 24 include prime granules in the prime region 23 and headlap granules in the headlap region 25. The prime granules are adhered in a prime region 23 on the upper surface 52 of the single-layer roofing shingle 48 (the surface exposed when the shingle is installed on a roof). The prime granules generally comprise mineral particulate matter that is produced, for example, from raw mineral ores. The prime granules are generally characterized by bulk densities ranging from 80 to 120 lbs/ft$^3$, unless lightweight prime granules are used. Furthermore, the specific gravity of the non-lightweight prime granules is generally at least 2.5, and generally ranges between 2.55 and 3.05, and the hardness of the prime granules generally is at least about a Moh hardness of 7 or higher.

Referring again to FIG. 1A, the low density headlap granules are adhered in a headlap region 25 on the upper surface 52 of the single-layer roofing shingle 48 (the surface that is covered by adjacent shingles when installed on a roof). In certain embodiments, the low density headlap granules are suitable for use in a roof covering manufacturing process in direct substitution for existing headlap materials.

In certain exemplary embodiments, the disclosure is directed to a laminated roofing shingle. In certain exemplary embodiments, the laminated roofing shingle consists of a plurality of layers. In certain exemplary embodiments, the laminated roofing shingle consists of two layers: an overlay and an underlay.

FIG. 3 illustrates an exemplary embodiment of an apparatus 310 for manufacturing an asphalt-based roofing material, and more particularly for applying expandable fire retardant material and granules onto an asphalt-coated layer. The illustrated manufacturing process involves passing a continuous sheet of fibrous substrate 312 in a machine direction 313 through a series of manufacturing operations. The sheet usually moves at a speed of at least about 200 feet/minute (61 meters/minute), and typically at a speed within the range of between about 450 feet/minute (137 meters/minute) and about 620 feet/minute (244 meters/minute). However, other speeds may be used.

In a first step of the manufacturing process, the continuous sheet of fibrous substrate 312 is payed out from a roll 314. The fibrous substrate 312 may be any type known for use in reinforcing asphalt-based roofing materials, such as a nonwoven web of glass fibers. Alternatively, the fibrous substrate may be a scrim or felt of fibrous materials such as mineral fibers, cellulose fibers, rag fibers, mixtures of mineral and synthetic fibers, or the like.

The sheet of fibrous substrate 312 is passed from the roll 314 through an accumulator 316. The accumulator 316 allows time for splicing one roll 314 of substrate to another, during which time the fibrous substrate 312 within the accumulator 316 is fed to the manufacturing process so that the splicing does not interrupt manufacturing.

Next, the fibrous substrate 312 is passed through a coater 318 where a coating of hot, melted asphalt 319 is applied to the fibrous substrate 312 to form an asphalt-coated sheet 320. The asphalt coating 319 may be applied in any suitable manner. In the illustrated embodiment, the fibrous substrate 312 contacts a roller 317, which is in contact with the supply of hot, melted asphalt 319. The roller 317 completely covers the fibrous substrate 312 with a tacky coating of asphalt 319. However, in other embodiments, the asphalt coating 319 could be sprayed on, rolled on, or applied to the fibrous substrate 312 by one or more other techniques.

Typically the asphalt coating is highly filled with a ground mineral filler material, amounting to at least about 42 percent by weight of the asphalt/filler combination. In certain exemplary embodiments, the asphalt coating 319 is applied at a temperature ranging from about 350° F. to about 400° F. In certain exemplary embodiments, the asphalt coating 319 may be applied at a temperature of more than 400° F. or less than 350° F. The fibrous substrate 312 exits the coater 318 as an asphalt-coated sheet 320. The asphalt coating 319 on the asphalt-coated sheet 320 remains hot. The asphalt-coated sheet 320 includes a continuous underlay sheet portion 370 and a continuous overlay sheet portion 372, as illustrated in FIG. 4 and described in detail below.

The asphalt-coated sheet 320 is passed beneath an expandable fire retardant material applicator 533 and a first granule applicator 322, where a repeated pattern of granule patches 374 is applied to the continuous underlay sheet portion 370 of the asphalt-coated sheet 320. As illustrated, the expandable fire retardant material applicator 533 appears prior to a first granule applicator 322 in a machine direction 313. However, one having skill in the art will readily recognize that the expandable fire retardant material applicator 533 may also be located in between or subsequent one or more granule applicators 322, 324, or the expandable fire retardant material applicator 533 may not be necessary at all, with the expandable fire retardant material added to the asphalt-coated sheet 320 concurrently with granules via one or more granule applicators 322, 324.

Related to the granules, the patches 374 of the repeated pattern of granule patches 374 correspond to the shapes and sizes of the repeated pattern of tabs 386 of a finished laminated roofing shingle 352, as shown in FIGS. 1E-1M. The patches 374 will be underneath the tabs 386, and will not be visible in the finished laminated shingle 352. Advantageously, relatively less expensive headlap granules 375 may be used to form the repeated pattern of granule patches 374. A shadow strip 378 is formed along an edge 392 (the upper edge when viewing FIG. 4) of the continuous underlay sheet portion 370, and will be described in detail below. The portion of the continuous underlay sheet portion 370 not covered by the patches 374 and the shadow strip 378 defines a prime region 376. The prime region 376 will be visible through the cutouts 388 of the finished laminated roofing shingle 352.

The asphalt-coated sheet 320 is then passed beneath a second granule applicator 324. In certain embodiments, the second granule applicator is a blend drop applicator. The second granule applicator 324 may apply blend drop granules 377 (FIG. 4) to the continuous overlay sheet portion 372 of the asphalt-coated sheet 320 to define blend drops 380. Although only one second granule applicator 324 is shown, it will be understood that several second granule applicators 324 may be used. Alternatively, the second granule applicator 324 may be adapted to supply several streams of granules (e.g., blend drops), or blend drops of different colors, shading, or size to the continuous overlay sheet portion 372. The second granule applicator 324 may also apply blend drop granules to the prime region 376 of the continuous underlay sheet portion 370 of the asphalt-coated sheet 320. In certain exemplary embodiments, a first or second granule applicator 322, 324 applies granules and/or expandable fire retardant material to the asphalt-coated sheet 320.

The asphalt-coated sheet 320 is then passed beneath a third granule applicator. In the illustrated embodiment, the third granule applicator is a backfall granule applicator 326, for applying additional granules, such as shadow granules to the shadow strip 378, background granules, and headlap granules onto the asphalt-coated sheet 320. In certain exemplary embodiments, a backfall granule applicator 326 applies granules and/or expandable fire retardant material to the asphalt-coated sheet 320.

The shadow granules are deposited along the edge 392 (the upper edge when viewing FIG. 4) of the continuous underlay sheet portion 370 and define the shadow strip 378. A portion of the shadow strip 378 will be visible adjacent an upper edge 390 of the cutout 388 of the laminated roofing shingle 352. The background granules are applied to the continuous overlay sheet portion 372 and adhere to a remainder portion 382, i.e., the portion of the continuous overlay sheet portion 372 of the asphalt-coated sheet 320 that is not already covered by the blend drops 380. Similarly, the headlap granules are applied to a headlap region 360 of the continuous overlay sheet portion 372.

The background granules are applied to the extent that the asphalt-coated sheet 320 becomes completely covered with granules, thereby defining a continuous granule-coated sheet 327. The granule-coated sheet 327 is then turned around a drum 330 to press the granules into the asphalt coating and to temporarily invert the sheet 327. Such inverting of the granule-coated sheet 327 causes any excess granules to drop off the granule-coated sheet 327 on the backside of the drum 330. The excess granules are collected by a hopper 332 of the backfall granule applicator 326 and may be reused. As described below, the hopper 332 is positioned on the backside of the drum 330.

While the sheet is inverted, a backdust and/or expandable fire retardant material may be applied by a backdust applicator 328 and/or expandable fire retardant material applicator 533 (not shown) to the back surface of the sheet 327. In certain exemplary embodiments, more than one backdust applicator 328 is utilized to apply backdust and/or expandable fire retardant material. In certain exemplary embodiments, the backdust comprises low density granules. In certain exemplary embodiments, the backdust is blended with expandable fire retardant material and applied along with at least a portion of the backdust. In certain exemplary embodiments, the backdust is applied separate from any expandable fire retardant material.

The continuous granule-coated sheet 327 is fed through pull rolls 334 that regulate the speed of the sheet 327 as it moves downstream. In certain exemplary embodiments, at least one of the pull rolls 334 is driven by a motor (not shown).

In the exemplary embodiment illustrated in FIG. 4, the granule-coated sheet 327 is subsequently fed through a rotary pattern cutter 336 that includes a bladed cutting cylinder 338, a backup roll 340, and a motor 342. The pattern cutter 336 cuts a repeated pattern of tabs 386 and cutouts 388. It will be understood that the tabs 362 may have any desired combination of color blend drops.

The pattern cutter 336 also cuts the granule-coated sheet 327 into the continuous underlay sheet 346 and the continuous overlay sheet 348. As shown in FIG. 4, the continuous underlay sheet 346 is directed to be aligned beneath the continuous overlay sheet 348, and the two layers 346, 348 are laminated together using adhesive at one or more adhesive sections (e.g., item 870 at FIG. 1H) to form a continuous laminated sheet 350. As shown in FIG. 3, the continuous underlay sheet 346 is routed on a longer path than the path of the continuous overlay sheet 348. Further downstream, the continuous laminated sheet 350 is passed into contact with a rotary length cutter 344 that cuts the laminated sheet 350 into individual laminated roofing shingles 352.

To facilitate synchronization of the cutting and laminating steps, various sensors and controls can be utilized, as disclosed in U.S. Pat. No. 6,635,140 to Phillips et al., the disclosure of which is herein incorporated by reference in its entirety. For example, a timing mark as known in the art and indicating the period of the repeated pattern of granule patches 374 may be applied to an appropriate part of the granule-coated sheet 327.

In certain exemplary embodiments, the timing mark may be applied within a patch 374, as shown at 354. In certain exemplary embodiments, the timing mark may be applied within the shadow strip 378, as shown at 356. In certain exemplary embodiments, the timing mark may be applied on a back side of the continuous underlay sheet portion 370, as shown by the dashed line 358. Any of the illustrated embodiments of the timing mark 354, 356, 358 may be used for synchronization in a known manner. The timing mark 354, 356, 358 may be applied by any technique, and may be a relatively thin blend drop of granules applied by a blender 324 or a timing mark blender (not shown). The timing mark 354, 356, 358 may comprise white or light colored granules. Alternatively, the timing mark 354, 356, 358 may also be any suitable light-colored material, such as paint, chalk, or the like. The timing may be sensed by a sensor, such as a photoeye 360, for synchronization with the rotating rotary pattern cutter 336.

Additionally, sensors, such as photoeyes 362 and 364 may be used to synchronize the pattern of granule patches 374 of the continuous shingle underlay sheet 346 with the tabs 386 of the continuous shingle overlay sheet 348. Such synchronization ensures that each granule patch 364 of the continuous shingle underlay sheet 346 is aligned with one of the tabs 386 of the continuous shingle overlay sheet 348. As used herein and the appended claims, the phase "aligned with" is defined as the shapes and sizes of the granule patches 374 in the repeated pattern of granule patches 374 corresponding to the shapes and sizes of the repeated pattern of tabs 386, such that the granule patches 374 are covered by the tabs 386 and only the prime granules of the prime region 376 are visible through the cutouts 388. Advantageously, by synchronizing and aligning each granule patch 364 of the continuous shingle underlay sheet 346 with one of the tabs 386 of the continuous shingle overlay sheet 348, the relatively more expensive prime granules are needed only for the prime region 376 of the continuous shingle underlay sheet 346 that will be visible through the cutouts 388 of the laminated roofing shingle 352. The relatively less expensive headlap granules may be used to form the pattern of granule patches 374 of the continuous underlay sheet 346.

Referring to FIGS. 1E and 1F, the granules deposited on the composite material shield the roofing asphalt material from direct sunlight, offer resistance to fire, and provide texture and color to the shingle. The headlap portions 404 may be ultimately covered by adjacent partially overlapping laminated roofing shingles 352 when installed upon a roof. When installed upon a roof, the granule patches 374 of the underlay 402 will be covered by the tabs 386, and the prime regions 376 of the underlay 402 will be visible through the cutouts 388. Prime granules are therefore used on the prime regions 376 of the underlay 402 so that the underlay 402 visible through the cutouts 388 always contains prime granules.

Figure 5:
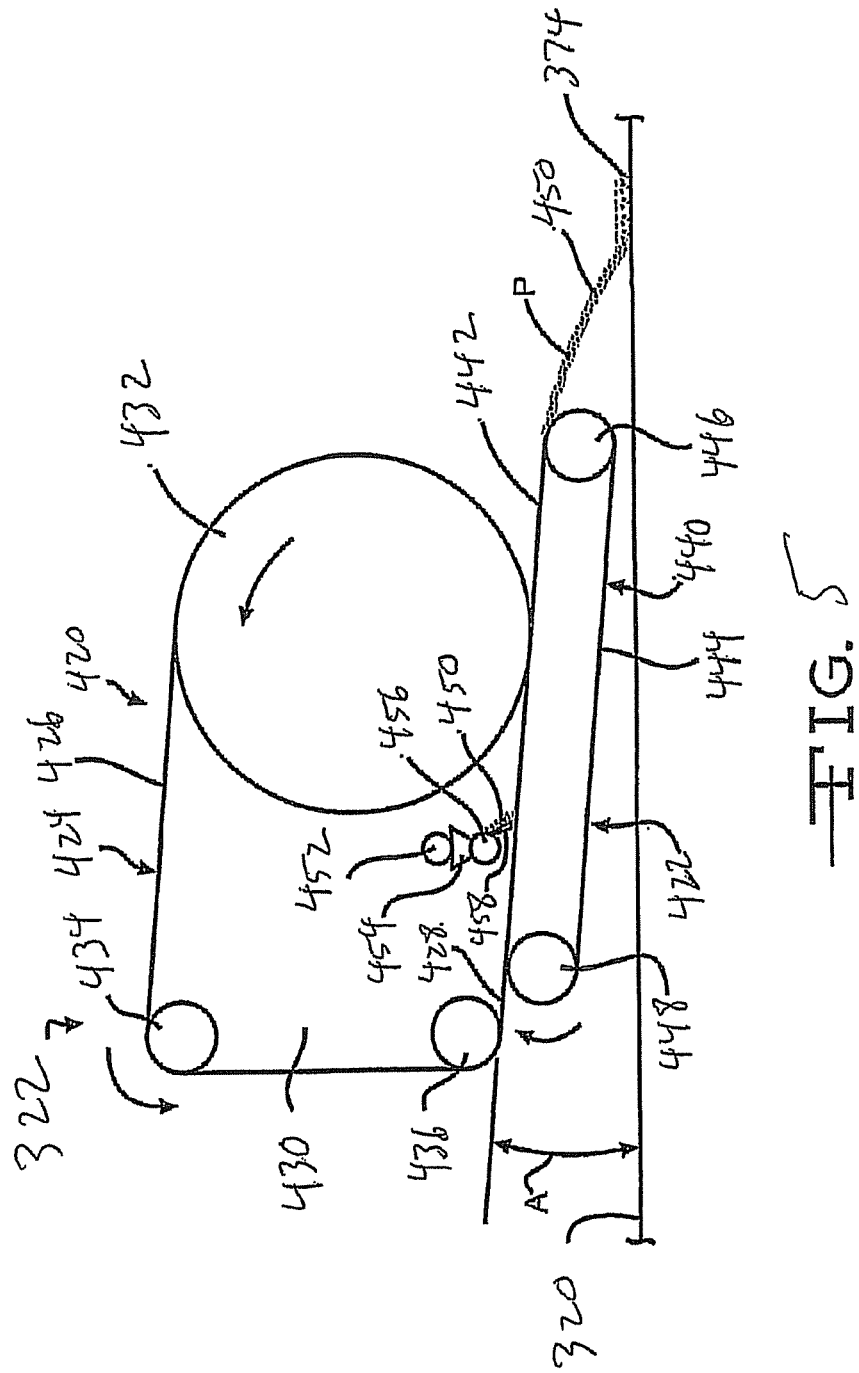
FIG. 5 illustrates an enlarged schematic view in elevation of an exemplary embodiment of the first granule applicator illustrated in FIG. 3.
Figure 6:
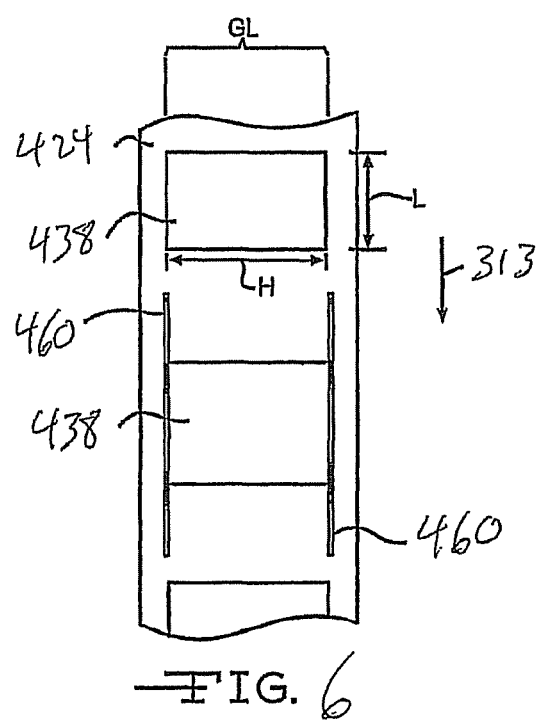
FIG. 6 illustrates a plan view of a portion of an exemplary embodiment of the continuous belt illustrated in FIG. 3, showing the pattern of holes.

Referring now to FIGS. 5 and 6, a first exemplary embodiment of the first granule applicator is shown generally at 322. The first granule applicator 322 includes a patch pattern belt assembly 420 and a granule patch conveyor 422.

As shown schematically in FIG. 5, the patch pattern belt assembly 420 includes a continuous belt 424 having an upper flight 426, a lower flight 428, and defining an interior space 430. The belt 424 travels around a first or forward large roller 432, an upper rear roller 434, and a lower rear roller 436. The patch pattern belt assembly 420 is operated by a motor (not shown) which causes the continuous belt 424 to travel at near machine speed, or the speed of the moving asphalt-coated sheet 320. In the illustrated embodiment, the upper rear roller 434 is mounted upwardly and forwardly (to the right when viewing FIG. 5) of the lower rear roller 436.

The continuous belt 424 includes a plurality of holes 438 forming a pattern of holes 438. The repeating pattern of holes 438 corresponds to the desired pattern of granule patches 374. Each hole 438 has a length L, measured in the machine direction 313, and a height H, equal to the length and height, respectively, of the granule patch 374 to be applied to the asphalt-coated sheet 320. The illustrated holes 438 have a rectangular shape. It will be understood however, that the holes 438 may have any other desired shape corresponding to a desired shape of the granule patches 374.

In the illustrated embodiment, the length of the continuous belt 424 is equal to the circumference of the pattern cutter 336. Alternatively, the continuous belt 424 may have other lengths, such as a length smaller than the circumference of the pattern cutter 336, or a length larger than the circumference of the pattern cutter 336.

As also shown schematically in FIG. 5, the granule patch conveyor 422 includes a continuous belt 440 having an upper flight 442 and a lower flight 444. The belt 440 travels around a first or forward roller 446 and a second or rear roller 448. The upper flight 442 of the granule patch conveyor 422 engages the lower flight 428 of the patch pattern belt assembly 420. In the illustrated embodiment, the upper flight 442 and the lower flight 428 are oriented at an acute angle A from a plane defined by the asphalt-coated sheet 320. In the illustrated embodiment, the angle A is about 5 degrees. Alternatively, the angle A is an angle within the range of from about 5 degrees to about 45 degrees. In another embodiment, the angle A is an angle within the range of from about 0 degrees to about 90 degrees.

The granule patch conveyor 422 is operated by a motor (not shown) which causes the continuous belt 440 to travel at near machine speed, or the speed of the moving asphalt-coated sheet 320.

The first granule applicator 322 supplies granules 450 to the interior space 430 of the patch pattern belt assembly 420. As shown schematically in FIG. 5, the first granule applicator 322 may include an auger 452 for moving granules 450 from a source of granules (not shown) to a hopper 454 within the interior space 430. Alternatively, granules 450 may be moved into the hopper 454 in the interior space 430 by other suitable technique. For example, the granules 450 may be moved into the hopper 454 through a gravity-feed device, such as a chute or tube (not shown).

The granules 450 may then be fed from the hopper 454 by a fluted roll 456 from which upon rotation, the granules 450 are discharged into contact with a chute 458. The illustrated chute 458 is elongated and substantially flat, although the chute may have other shapes, such as a substantially curved cross-sectional shape. The chute 458 extends outwardly and in a downstream direction. The chute 458 guides the granules 450 radially outwardly and downwardly from the fluted roll 456 and into each of the holes 438 in the continuous belt 424.

If desired, side guides or rails, schematically illustrated at 460 in FIG. 6, may be mounted within the interior space 430 to maintain the granules 450 within a granule patch lane GL, the width of which is defined by the height H of the holes 438.

It will be understood that the first granule applicator 322 described above is not required, and that other granule applicators may be provided. Examples of other suitable granule applicators include the embodiments of the blend drop application station disclosed in commonly-assigned U.S. Patent Application Publication Nos. 2012/0183684 and 2012/0183685, each to Aschenbeck, the disclosures of which are incorporated herein by reference in their entirety.

It will be further understood that the hopper 454 and fluted roll 456 described above are not required, and that any other desired granule dispenser may be provided within the interior space 430. Examples of other suitable granule dispensers include a hopper having a slide gate, and a vibratory feeder.

In operation, continuous belt 424 of the patch pattern belt assembly 420 is caused to move in a counter-clockwise direction and the continuous belt 440 of the granule patch conveyor 422 is caused to move in a clockwise direction when viewing FIG. 5.

The granules 450 may be selectively dispensed or discharged into the interior space 430. As used herein, the phrase "selectively dispensed or discharged" is defined as controlling the rate of flow of the granules 450 into the interior space 430 and/or controlling the axial position of the discharged granules 450 to ensure the granules 450 are discharged substantially onto the upper flight 442 of the granule patch conveyor 422 within each of the holes 438. For example, the rate of flow out of the granule dispenser 322 may be pre-calibrated and programmed to provide a desired predetermined rate that may vary depending on the line-speed and/or the specific pattern of holes 438 formed in the continuous belt 424. The granules 450 that have been discharged onto the upper flight 442 of the granule patch conveyor and within the holes 438 therefore define the granule patches 374 to be applied to the asphalt-coated sheet 320.

Each granule patch 374 continues to travel on the upper flight 442. As the belt 440 turns around the forward roller 446, each granule patch 374 is released from contact with the belt 440. The granule patch 374 then moves forwardly and downwardly at near-sheet speed to the asphalt-coated sheet 320 along a path generally shown by the line P.

Any patents referred to herein, are hereby incorporated herein by reference, whether or not specifically done so within the text of this disclosure.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the applicants intend to indicate "only A or B but not both," then the term "only A or B but not both" will be employed. Thus, use of the term "or" herein is the inclusive, and not the exclusive use. See Bryan A. Garner, A Dictionary of Modern Legal Usage 624 (2d ed. 1995). Also, to the extent that the terms "in" or "into" are used in the specification or the claims, it is intended to additionally mean "on" or "onto." Furthermore, to the extent that the term "connect" is used in the specification or the claims, it is intended to mean not only "directly connected to," but also "indirectly connected to" such as connected through another component or components. In the present disclosure, the words "a" or "an" are to be taken to include both the singular and the plural. Conversely, any reference to plural items shall, where appropriate, include the singular.

All ranges and parameters disclosed herein are understood to encompass any and all subranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The general inventive concepts have been illustrated, at least in part, by describing various exemplary embodiments thereof. While these exemplary embodiments have been described in considerable detail, it is not the Applicant's intent to restrict or in any way limit the scope of the appended claims to such detail. Furthermore, the various inventive concepts may be utilized in combination with one another (e.g., one or more of the first, second, third, fourth, etc., exemplary embodiments may be utilized in combination with each other). Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The invention claimed is:

1. A layer of a roofing shingle having an upper surface and an under surface, the layer comprising:
   a fibrous substrate;
   an asphalt coating on the fibrous substrate;
   granules disposed on the asphalt coating; and
   expandable fire retardant material disposed directly on the upper surface of said layer as a particulate material,
   wherein said expandable fire retardant material has an average bulk density ranging from 1 to 3 $g/cm^3$ and a start expansion temperature ranging from 150 to 250° C.;
   wherein the expandable fire retardant material is a plurality of particles having an average particle size ranging from 50 to 1000 microns;
   wherein said expandable fire retardant material is present in said layer in an amount ranging from 0.01 to 1.0 lb/square; and further
   wherein the expandable fire retardant material is disposed only in an area within two inches of a sealant section.

2. A roofing shingle comprising at least two layers according to claim 1.

3. The layer of roofing shingle of claim 1, wherein the expandable fire retardant material comprises expandable graphite.

4. The layer of roofing shingle of claim 1, wherein the expandable fire retardant material consists of expandable graphite.

5. A roofing system comprising a plurality of partially overlapping courses of roofing shingles thereby creating an overlapping seam, wherein each shingle comprises at least one layer comprising:
- a fibrous substrate;
- an asphalt coating on the fibrous substrate;
- granules disposed on the asphalt coating; and
- expandable fire retardant material disposed directly on the upper surface of said layer as a particulate material,
- wherein said expandable fire retardant material expands upon exposure to fire at a temperature of at least 150° C. thereby closing at least a portion of the overlapping seam;
- wherein the expandable fire retardant material is a plurality of particles having an average particle size ranging from 50 to 1000 microns; and
- wherein the expandable fire retardant material is disposed only in an area within two inches of a sealant section.

6. The roofing system of claim 5, wherein the roofing shingles are laminated roofing shingles.

7. A laminated roofing shingle having an upper surface and an under surface, the laminated roofing shingle comprising:
- at least two layers bonded by an adhesive section, wherein each layer comprises:
- a fibrous substrate;
- an asphalt coating on the fibrous substrate;
- granules disposed on the asphalt coating; and
- expandable graphite particles having an average bulk density ranging from 1.3 to 2.8 g/cm$^3$ and a start expansion temperature ranging from 150 to 250° C., disposed directly on the upper surface,
- wherein the expandable fire retardant material is a plurality of particles having an average particle size ranging from 50 to 1000 microns; and
- wherein the expandable graphite particles are disposed only in an area within two inches of a sealant section.

8. The laminated roofing shingle of claim 7, wherein the laminated roofing shingle comprises a plurality of sealant sections.

* * * * *